US012608067B1

(12) United States Patent
Penner

(10) Patent No.: US 12,608,067 B1
(45) Date of Patent: Apr. 21, 2026

(54) SYSTEMS AND METHODS FOR MONITORING AND RECORDING THE EFFECTS OF WEATHER EVENTS

(71) Applicant: WeatherEyes LLC, Memphis, TN (US)

(72) Inventor: Samuel Penner, Lebanon, TN (US)

(73) Assignee: WeatherEyes LLC, Memphis, TN (US)

( * ) Notice: Subject to any disclaimer, the term of this patent is extended or adjusted under 35 U.S.C. 154(b) by 0 days.

(21) Appl. No.: 19/181,341

(22) Filed: Apr. 17, 2025

(51) Int. Cl.
| | |
|---|---|
| *G06F 1/3206* | (2019.01) |
| *G01W 1/02* | (2006.01) |
| *G01W 1/10* | (2006.01) |
| *G06V 10/82* | (2022.01) |
| *G06V 20/10* | (2022.01) |
| *G06V 20/52* | (2022.01) |

(52) U.S. Cl.
CPC ............. *G06F 1/3206* (2013.01); *G01W 1/02* (2013.01); *G01W 1/10* (2013.01); *G06V 10/82* (2022.01); *G06V 20/176* (2022.01); *G06V 20/52* (2022.01)

(58) Field of Classification Search
CPC ...... G06F 1/3206; G06V 20/52; G06V 10/82; G06V 20/176; G01W 1/02; G01W 1/10
See application file for complete search history.

(56) References Cited

U.S. PATENT DOCUMENTS

| | | | | |
|---|---|---|---|---|
| 9,986,313 | B2 * | 5/2018 | Schwarzkopf | .......... H04Q 9/00 |
| 10,126,188 | B2 | 11/2018 | Martin et al. | |
| 10,497,250 | B1 | 12/2019 | Hayward et al. | |

| | | | | |
|---|---|---|---|---|
| 10,572,948 | B1 | 2/2020 | Cook et al. | |
| 11,113,534 | B1 | 9/2021 | Conger et al. | |
| 11,315,194 | B2 | 4/2022 | Blessman et al. | |
| 11,353,623 | B2 | 6/2022 | Schiff et al. | |
| 11,488,255 | B1 | 11/2022 | Mast et al. | |
| 11,647,314 | B2 | 5/2023 | Felks et al. | |
| 11,875,782 | B2 | 1/2024 | Smith et al. | |
| 11,922,524 | B2 | 3/2024 | Splittstoesser | |
| 2012/0268292 | A1 * | 10/2012 | Rock | ....................... G01W 1/02 340/870.03 |
| 2014/0313406 | A1 | 10/2014 | Becker | |
| 2015/0115710 | A1 * | 4/2015 | Tuerk | ..................... H05B 47/19 307/23 |
| 2015/0288868 | A1 * | 10/2015 | Slavin | ................... H04N 7/181 348/159 |

(Continued)

FOREIGN PATENT DOCUMENTS

| | | |
|---|---|---|
| CN | 112468972 A | 3/2021 |

OTHER PUBLICATIONS

BloomSky, "The smart weather network", BloomSky, Published Online, Available at https://www.bloomsky.com/ (Accessed on Apr. 17, 2025).

(Continued)

*Primary Examiner* — Gary Collins

(57) ABSTRACT

This disclosure generally relates to systems and methods for monitoring and recording weather event impacts on structures. A weather evaluation system can include onsite devices installed at structure locations that leverage various sensor integrations and/or AI models to permit precise, localized weather monitoring at the structures. The sensor integrations and/or AI models utilized by the onsite devices can facilitate the detection and documentation of weather damage on structures, such as damage caused by hail, high-speed winds, or the like.

18 Claims, 6 Drawing Sheets

100

(56) References Cited

U.S. PATENT DOCUMENTS

| | | | |
|---|---|---|---|
| 2017/0301030 A1* | 10/2017 | Wedig .................... | G06Q 40/08 |
| 2020/0134753 A1* | 4/2020 | Vickers ................. | G06Q 40/08 |
| 2020/0401963 A1* | 12/2020 | Matuchniak ........... | H04L 51/04 |
| 2022/0254004 A1* | 8/2022 | Shayne ................. | H04N 7/188 |
| 2023/0039833 A1 | 2/2023 | Mast et al. | |

OTHER PUBLICATIONS

Michael Hemsworth, "The 'BloomSky' Outdoor Weather Station Kit Keeps an Eye on the Sky", TrendHunter, Apr. 30, 2016, Published Online, Available at https://www.trendhunter.com/trends/outdoor-weather-station (Accessed on Apr. 17, 2025).

Tanya Brown et al., "Evaluating hail damage using property insurance claims data", Weather, Climate, and Society, Jul. 1, 2015, pp. 197-210, vol. 7, American Meteorological Society, Published Online, Available at https://journals.ametsoc.org/view/journals/wcas/7/3/wcas-d-15-0011_1.xml (Accessed on Apr. 17, 2025).

* cited by examiner

100

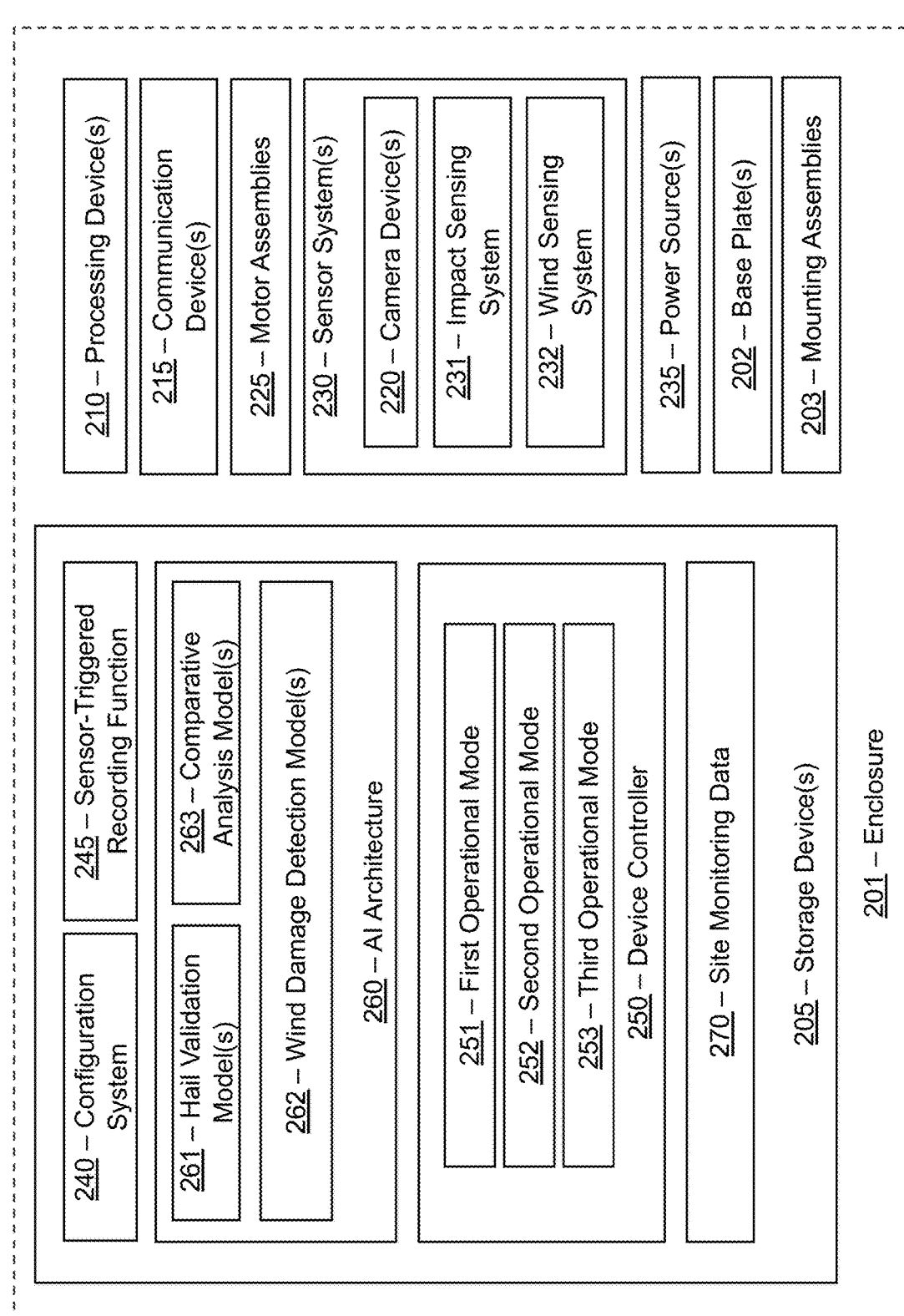

150

210 – Processing Device(s)

215 – Communication Device(s)

225 – Motor Assemblies

230 – Sensor System(s)

220 – Camera Device(s)

231 – Impact Sensing System

232 – Wind Sensing System

235 – Power Source(s)

202 – Base Plate(s)

203 – Mounting Assemblies

240 – Configuration System

245 – Sensor-Triggered Recording Function

261 – Hail Validation Model(s)

263 – Comparative Analysis Model(s)

262 – Wind Damage Detection Model(s)

260 – AI Architecture

251 – First Operational Mode

252 – Second Operational Mode

253 – Third Operational Mode

250 – Device Controller

270 – Site Monitoring Data

205 – Storage Device(s)

201 – Enclosure

FIG. 2A

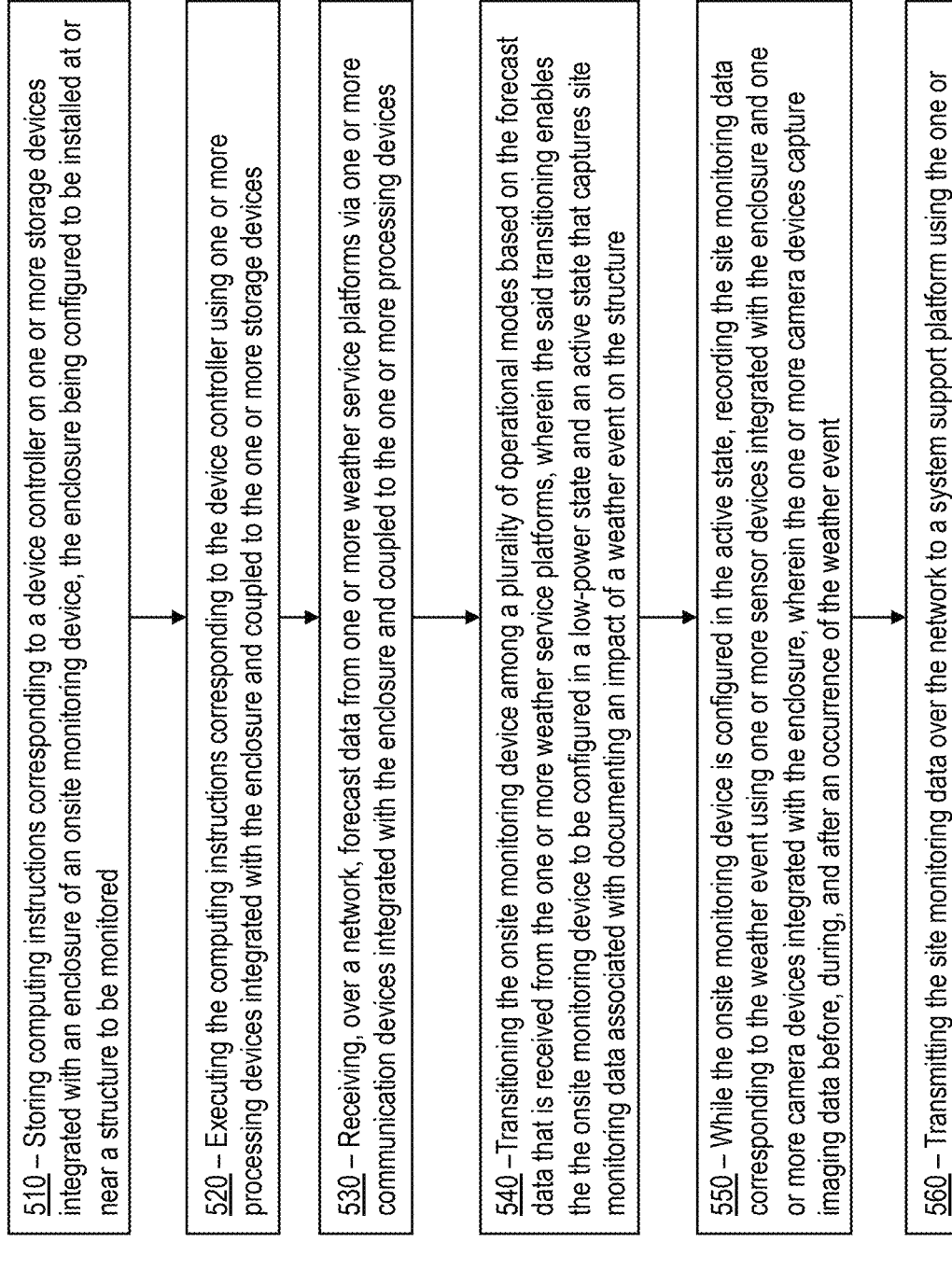

510 – Storing computing instructions corresponding to a device controller on one or more storage devices integrated with an enclosure of an onsite monitoring device, the enclosure being configured to be installed at or near a structure to be monitored 520 – Executing the computing instructions corresponding to the device controller using one or more processing devices integrated with the enclosure and coupled to the one or more storage devices 530 – Receiving, over a network, forecast data from one or more weather service platforms via one or more communication devices integrated with the enclosure and coupled to the one or more processing devices 540 –Transitioning the onsite monitoring device among a plurality of operational modes based on the forecast data that is received from the one or more weather service platforms, wherein the said transitioning enables the the onsite monitoring device to be configured in a low-power state and an active state that captures site monitoring data associated with documenting an impact of a weather event on the structure 550 – While the onsite monitoring device is configured in the active state, recording the site monitoring data corresponding to the weather event using one or more sensor devices integrated with the enclosure and one or more camera devices integrated with the enclosure, wherein the one or more camera devices capture imaging data before, during, and after an occurrence of the weather event 560 – Transmitting the site monitoring data over the network to a system support platform using the one or more communication devices integrated with the enclosure

SYSTEMS AND METHODS FOR MONITORING AND RECORDING THE EFFECTS OF WEATHER EVENTS

TECHNICAL FIELD

This disclosure is related to improved systems, methods, apparatuses, and techniques for monitoring and recording the impacts of weather events on structures, such as buildings, houses, and/or other types of structures. In certain embodiments, onsite monitoring devices equipped with various types of sensor systems and/or AI analysis models can be installed at various structures to detect occurrences of weather events and record data demonstrating the damage or impact of the weather events on the structures.

BACKGROUND

In recent years, the frequency and severity of damage-causing weather events have significantly increased. Severe weather events, including those that involve hail impacts, high winds, storms, or the like, often cause damage to buildings, houses, and other structures in geographic areas affected by the events. For example, hail impacts on these structures can cause physical damage to roofs, windows, and/or exterior surfaces, leading to leaks and structural integrity issues. Likewise, high winds can dislodge roofing materials, break windows, and cause debris to impact structures. Additionally, severe weather conditions such as heavy rain, snow, and lightning can exacerbate existing vulnerabilities in structures, leading to water infiltration, electrical hazards, and/or compromised structural components. These weather events not only pose a threat to the physical integrity of structures, but also create challenges for property owners in terms of repair costs and insurance claims.

Traditional techniques for weather monitoring often rely on large-area weather estimates or radar-based swaths to predict severe events. These methods provide a broad overview of potential weather conditions across extensive geographic regions, offering valuable insights for general forecasting and public safety alerts. However, they lack the precision needed to confirm the exact occurrence of severe weather events at the individual property level. Radar-based swaths, for instance, can indicate the likelihood of hail or high winds in a general geographic area, but do not provide definitive evidence of these conditions impacting specific properties. Thus, while these traditional techniques can be useful to provide early warnings of severe weather events in many cases, they fail to confirm actual ground-level damage for any given property structure or site.

For example, traditional weather monitoring techniques might suggest that hail impacted a particular geographic area, yet due to the unique path of the storm, certain neighborhoods or specific structures within that area may have been spared. This discrepancy arises because radar-based swaths and large-area estimates cannot account for the localized nature of storm patterns, which can result in uneven distribution of weather impacts. Conversely, these techniques might indicate that a geographic area was largely unaffected by a high-speed wind event, but they may fail to detect that a small offshoot of the storm striking several neighborhoods or structures within that area. Such localized impacts can go unnoticed, leaving property owners with no evidence to support claims or repairs.

Additionally, because large-area weather estimates or radar-based swaths provide weather information on a more global basis, they are inherently limited in their ability to deliver real-time data at the individual property or site level. These techniques are designed to offer a broad perspective on weather conditions, which is useful for general forecasting and issuing public safety alerts. However, they do not have the granularity required to monitor specific locations in real-time. As a result, they provide no means to record the actual impact of weather events on specific properties or sites. This lack of localized data can hinder efforts to assess damage accurately, complicate insurance claims, and delay necessary repairs, underscoring the need for more targeted weather monitoring solutions that can deliver precise, site-specific insights.

In view of the foregoing, there is a growing need for more localized and accurate weather monitoring solutions that can provide real-time data and record evidence of weather impacts at the property level.

The background description provided herein is for the purpose of presenting context of the disclosure. The materials described in this section are not prior art to the claims in this application and are not admitted to be prior art, or suggestions of the prior art, by inclusion in this section.

BRIEF DESCRIPTION OF DRAWINGS

To facilitate further description of the embodiments, the following drawings are provided, in which like references are intended to refer to like or corresponding parts, and in which:

FIG. 2A is a block diagram demonstrating exemplary features of an onsite monitoring device in accordance with certain embodiments;

FIG. 5 is a flowchart illustrating another exemplary method in accordance with certain embodiments.

Figure 1:
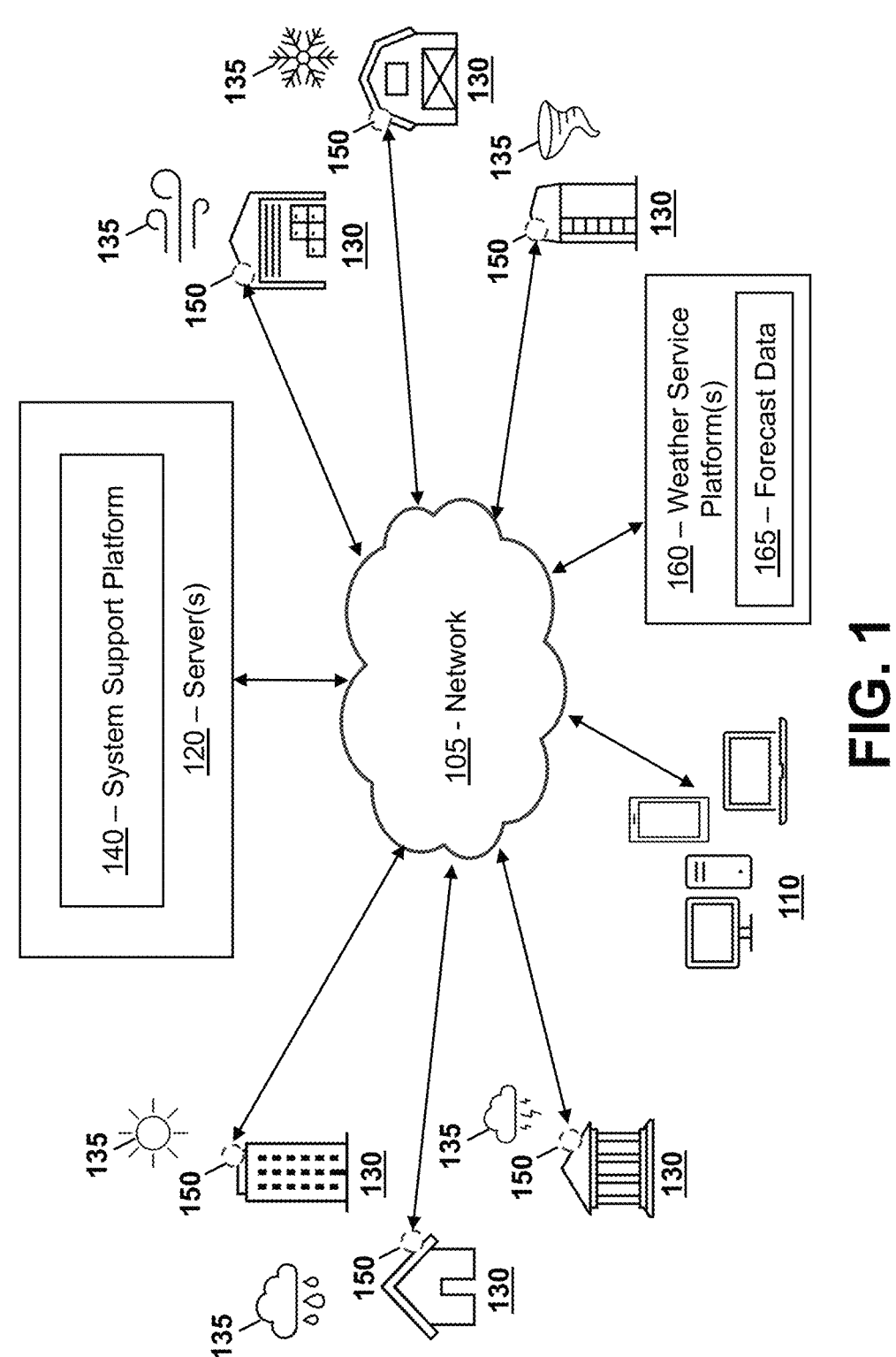
FIG. 1 is a network diagram of an exemplary system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION

The present disclosure relates to systems, methods, apparatuses, and devices for site-specific and/or property-centric weather monitoring solutions that can provide real-time data on property structure conditions and/or record evidence of weather impacts at the property level.

In certain embodiments, a system support platform hosted on one or more servers may communicate with a plurality of onsite monitoring devices installed on property structures in various geographic locations. Each of the onsite monitoring devices can be configured to detect, monitor, and/or record localized weather conditions at their corresponding property structure locations and generate various types of site monitoring data to document the impact of the weather conditions on the property structures. In some examples, each of the onsite monitoring devices can be configured to detect, monitor, and/or record hail impacts, high-speed wind conditions, and/or other damage-causing weather conditions, and can record various types of site monitoring data to demonstrate the damage or effect of the weather conditions on property structures. The system support platform can operate as a centralized hub or endpoint that collects and aggregates the site monitoring data across various onsite monitoring devices and across various property locations. End-users can access the system support platform to access, view, and/or process the site monitoring information generated by their respective onsite monitoring devices.

The hardware and/or software configurations of the onsite monitoring devices described herein can vary. In certain embodiments, an onsite monitoring device can comprise an enclosure or housing that integrates one or more memory storage devices, one or more processing devices, one or more communication devices, and one or more sensor systems configured to detect, monitor, and/or record weather conditions at the location of a structure where the device is installed. The onsite monitoring device additionally may include one or more mounting assemblies that enable the onsite monitoring device to be coupled to a surface at the location of the structure and one or more power sources, which can supply power to some or all of the components integrated into the enclosure. The onsite monitoring device additionally may include a device controller that operates to control the onboard operations of the onsite monitoring device and/or its components.

Various types of sensor systems can be integrated into the onsite monitoring device. In one example, the onsite monitoring device may integrate an impact sensing system that includes one or more accelerometers, one or more vibration sensors, and/or other sensor devices configured to generate sensor measurements that can be utilized to detect or predict the presence of hail and/or other types of precipitation. In accordance with certain embodiments, the impact sensing system can compare the sensor measurements with hail signature patterns (or other types of precipitation signature patterns) to detect whether a structure has been impacted by hail (or other precipitation conditions). In another example, the onsite monitoring device also may integrate a wind sensing system that comprises anemometers and/or other sensing mechanisms to detect wind speed and/or other wind-related measurements.

In certain embodiments, the onsite monitoring device may additionally integrate one or more camera devices that are configured to capture imaging data (e.g., videos, static images, IR images, night vision images, etc.) at a location or structure where the one or more camera devices are installed. In some examples, a device controller may cause the one or more camera devices to capture imaging data prior to the occurrence of a weather event to record and establish pre-event conditions of the structure, and also may cause the one or more camera devices to capture imaging data during and after the occurrence of the weather event. As explained in other portions of this disclosure, the pre-event and post-event imaging data can be analyzed to identify the damage or impact of the weather event on the structure.

In certain embodiments, the device controller of the onsite monitoring device also may execute one or more sensor-triggered recording functions. configured to automatically activate at least one camera device in response to specific sensor readings and/or detections of particular weather conditions. In some examples, a sensor-triggered recording function may utilize accelerometers and/or vibration sensors to detect hail impacts on the structure, initiating recording to capture visual and/or audio evidence of the event. In other examples, a sensor-triggered recording function may be designed to respond to significant changes in wind speed detected by anemometers, triggering at least one camera devices to record potential wind-related damage. The sensor-triggered recording functions can enable the onsite monitoring device to conserve power by activating the camera devices only when necessary, based on predefined thresholds or patterns recognized by the sensor systems.

In certain embodiments, the device controller of the onsite monitoring device also may execute an algorithm or process that operates to transition the onsite monitoring device among various operational modes in response to forecast data that is received from one or more weather service platforms. In some examples described in this disclosure, the device controller can be configured to transition the onsite monitoring device among a first operational mode, a second operational mode, and a third operational mode based on the content of the forecast data.

In the first operational mode, the onsite monitoring device may operate in a low-power state, where the majority of its components are deactivated or idle, maintaining minimal energy consumption. This mode is typically engaged when forecast data does not indicate any imminent severe weather events, allowing the device to perform routine monitoring with periodic checks for updated forecast information.

In the second operational mode, the device transitions to a heightened state of alert in response to forecast data suggesting the potential for severe weather. During this mode, the device may activate temporarily activate one or more camera devices to capture pre-event conditions at the structure prior to the occurrence of a weather event.

In the third operational mode, the onsite monitoring device enters a fully active state, which can leverage any of the device's components and systems to comprehensively monitor and document the impact of an ongoing severe weather event. This mode may be triggered by forecast data indicating an active weather alert corresponding to an incoming or imminent severe weather event, such as a storm or high winds, prompting the device to utilize its array of sensors and recording functions to capture detailed data about the weather event and/or its impact on the structure. Once the severe weather event has subsided, the device may revert to the second or first operational mode, depending on the updated forecast conditions.

The aforementioned technique for controlling an onsite monitoring device using multiple operational modes provides several benefits. Amongst other things, it allows for efficient power management by selectively activating/deactivating components across the various modes, which can be particularly advantageous for battery-operated devices. Additionally, it reduces wear and tear on device components by minimizing their activation when not needed, thereby prolonging the lifespan of the hardware. Furthermore, this approach can reduce network traffic by selectively transmitting site monitoring data only during relevant weather events, enhancing bandwidth usage and prioritizing critical data during severe conditions at affected sites.

In certain embodiments, the capabilities of the onsite monitoring device can be enhanced or supplemented by leveraging an artificial intelligence (AI) architecture, which comprises one or more learning models trained to analyze and interpret imaging content captured by one or more camera devices integrated with the onsite monitoring device. These pre-trained learning models can process the imaging content to detect and/or extract details corresponding to weather events and/or the impact of the weather events on structures.

In some examples, the AI architecture may incorporate a comparative analysis model that is adapted to receive pre-event and post-event images of a structure, and compare the pre-event images with the post-event images to identify damage or determine an impact of a weather event on the structure. In other examples, the AI architecture may include a hail validation model that is configured to analyze imaging content captured by the one or more camera devices to detect and confirm the presence of hail during a weather event, in some cases, utilizing computer vision techniques to identify hail-specific objects within the images or videos and/or extract data corresponding to the detected hail conditions (e.g., hail size, severity, etc.). In other examples, the AI architecture may include a wind damage detection model configured to analyze imaging content captured by the camera devices to identify signs of wind-related damage, such as missing shingles, debris impacts, or structural changes, using computer vision techniques to assess the extent of damage caused by high wind conditions. Other types of models also may be incorporated into the AI architecture.

The various components and functionalities of the onsite monitoring device enable it to generate and/or collect a wide range of site monitoring data associated with a weather event and/or the impact of the weather event on a structure where the onsite monitoring device is installed. In some examples, the site monitoring data may comprise imaging data (e.g., static images or videos) captured before, during, and/or after an occurrence of a weather event, information extracted from the imaging data by the AI architecture (e.g., insights detecting hail impacts and related metrics, damage assessments, etc.), readings or measurements acquired by various sensors or devices (e.g., such as an accelerometer, vibration sensor, anemometer, temperature sensors, humidity sensors, barometric pressure sensors, etc.), information derived from the readings or measurements (e.g., hail impacts, wind speeds, etc.), and/or forecast data received from one or more weather service platforms. The site monitoring data can be stored locally by one or more memory devices integrated with the onsite monitoring device and/or can be transmitted to the system support platform.

In some embodiments, the system support platform may enable end-users to login and access the site monitoring data generated by their respective onsite monitoring devices. In some examples, the system support platform may enable each end-user to access dashboard functions for remotely accessing, monitoring, and/or managing their onsite monitoring devices, allowing them to view real-time data generated by their onsite monitoring devices, adjust device settings, and/or review historical site monitoring data collected during weather events.

Additionally, in some examples, the system support platform may comprise an event documentation system that can enable an end-user to generate structure impact results summarizing the damage or impact of a weather event on the end-user's affected property structures. The structure impact results can incorporate some or all of the site monitoring data, and the structure impact results can be reformatted or repurposed for various objectives (e.g., assessing property damage, submitting insurance claims, making repairs, integrating preventative measures, etc.). Thus, the event documentation system can provide an automated mechanism that enables an end-user to instantly access evidence of structure impact or damage caused by a weather event using the site monitoring data collected by the sensors, cameras, devices, and/or components of the onsite monitoring devices.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

FIG. 1 is a diagram of an exemplary system 100 in accordance with certain embodiments.

The system 100 comprises one or more computing devices 110, one or more servers 120, one or more onsite monitoring devices 150, and/or one or more weather service platforms 160 that are in communication over a network 105. A system support platform 140 is stored on, and executed by, the one or more servers 120. The network 105 may represent any type of communication network, e.g., such as one that comprises a local area network (e.g., a Wi-Fi network), a personal area network (e.g., a Bluetooth network), a wide area network (e.g., a LoRaWAN network), an intranet, the Internet, a cellular network, a television network, a satellite communication network (e.g., the Starlink network), and/or other types of networks.

All the components illustrated in FIG. 1, including the computing devices 110, servers 120, onsite monitoring devices 150, and/or weather service platforms 160 can be configured to communicate directly with each other and/or over the network 105 via wired or wireless communication links, or a combination of the two. Each of the computing devices 110, servers 120, onsite monitoring devices 150, and/or weather service platforms 160 can include one or more storage devices, one or more processing devices, and/or one or more communication devices.

The one or more storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more storage devices include physical, non-transitory mediums. The one or more computer storage devices can store instructions for implementing any of the functionalities associated with the computing devices 110, servers 120, onsite monitoring devices 150, and/or weather service platforms 160.

The one or more processing devices may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more storage devices including, but not limited to, instructions associated with executing the functionalities performed by the computing devices 110, servers 120, onsite monitoring devices 150, and/or weather service platforms 160.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, servers 120, onsite monitoring devices 150, and/or weather service platforms 160 to be connected to the Internet and/or other network. The modem devices can permit bi-directional communication between the Internet (and/or other network) and the computing devices 110, servers 120, onsite monitoring devices 150, and/or weather service platforms 160. In certain embodiments, one or more router devices and/or access points may enable the computing devices 110, servers 120, onsite monitoring devices 150, and/or weather service platforms 160 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, onsite monitoring devices 150, and/or weather service platforms 160 to access the Internet and/or other networks.

In certain embodiments, the computing devices 110 may represent desktop computers, laptop computers, mobile devices (e.g., smartphones, personal digital assistants, tablet devices, vehicular computing devices, wearable devices, or any other device that is mobile in nature), gaming consoles and/or other types of devices. End-users may operate the computing devices 110 to communicate with and/or access the system support platform 140, onsite monitoring devices 150, and/or weather service platforms 160.

The one or more servers 120 may generally represent any type of computing device, including any of the computing devices 110 mentioned above. The one or more servers 120 also can comprise one or more mainframe computing devices, one or more virtual servers, one or more application servers, and/or one or more cloud-based servers. In some embodiments, the one or more servers 120 can include a cloud-based server system that hosts the system support platform 140 in a cloud environment. In some embodiments, the one or more servers 120 can be configured to execute web servers and can communicate with the computing devices 110, servers 120, onsite monitoring devices 150, and/or weather service platforms 160 over the network 105 (e.g., over the Internet).

As mentioned above, some or all of the computing devices 110 may represent mobile electronic devices in certain embodiments. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, California, United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, and/or (iv) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android® operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

The mobile electronic devices can additionally, or alternatively, include wearable devices (e.g., wearable user computer devices) as mentioned above. Generally speaking, wearable devices can generally include any type of electronic device that is capable of be mounted to, worn by, and/or fixed to an individual. For example, in some cases, the wearable devices sometimes can be worn under or over clothing, and/or integrated with the clothing and/or other accessories (e.g., hats, eyeglasses, wristbands, watches, shoes, gloves, etc.). In some cases, wearable devices can be directly mounted or attached to individuals (e.g., the individuals' head, wrist, arms, legs, or neck regions). The wearable devices can comprise a head mountable wearable user computer device (e.g., one or more head mountable displays, one or more eyeglasses, one or more contact lenses, one or more retinal displays, etc.) and/or a limb mountable wearable user computer device (e.g., a smart watch). In some configurations, the wearable devices can be configured to present audio and/or visual data (e.g., text, images, videos, audio, music, etc.) and/or to receive inputs from individuals (e.g., via one or more input devices such as touchscreens, switches, buttons, etc.). The mobile electronic devices can include additional types of devices other than those explicitly mentioned herein.

In certain embodiments, the system support platform 140 can be stored on, and executed by, the one or more servers 120. Additionally, or alternatively, the system support platform 140 can be stored on, and executed by, the one or more computing devices 110. Thus, in some embodiments, the system support platform 140 can be stored as server application on one or more servers 120 and, in other embodiments, can be stored as a local application on a computing device 110, or integrated with a local application stored on a computing device 110.

Additionally, in some embodiments, the system support platform 140 can be implemented as a combination of a front-end application (e.g., which is stored on a computing device 110) and a back-end application (e.g., which is stored on one or more servers 120). All functionalities of the system support platform 140 described herein can be executed by the front-end application, the back-end application, or a combination of both.

In certain embodiments, the one or more computing devices 110 can enable end-users to access the system support platform 140 over the network 105 (e.g., over the Internet via a web browser application). For example, end-users may access the system support platform 140 to view or access site monitoring data collected or generated by the onsite monitoring devices 150 installed at various structures 130 and/or to access or generate documentation corresponding to the impact of weather events 135 on the structures 130.

The structures 130 may generally correspond to buildings (e.g., commercial, industrial, and/or residential buildings), houses, brick-and-mortar establishments, barns, sheds, garages, enclosures, or the like. One or more onsite monitoring devices 150 can be installed or situated at each structure 130 that is monitored by the system.

Figure 3:
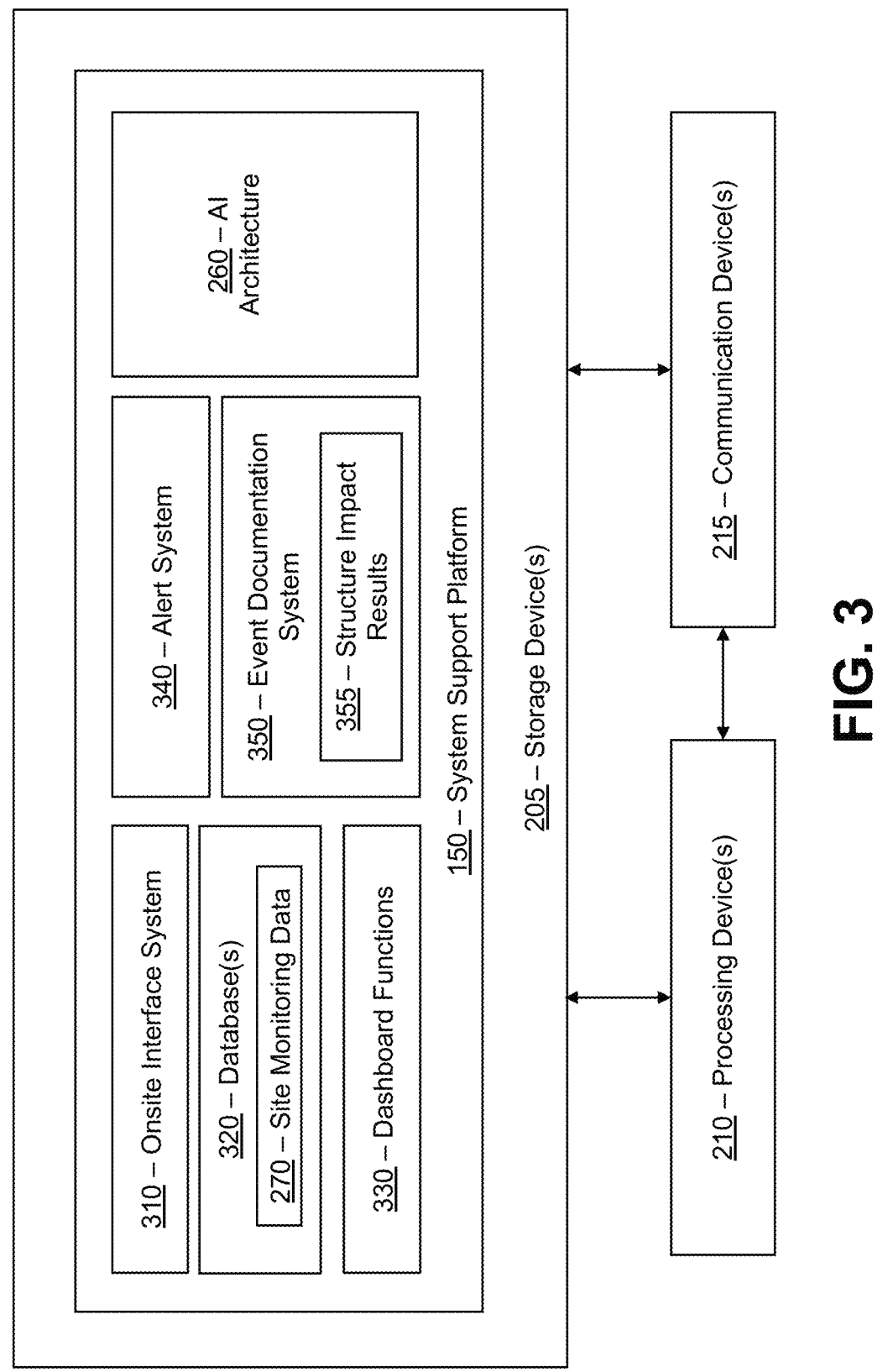
FIG. 3 is a block diagram demonstrating exemplary features of a system support platform in accordance with certain embodiments.

In some examples, a provider of the system support platform 140 may provide or distribute onsite monitoring devices 150 to various end-users seeking to monitor and/or record the impact of weather events 135 on structures 130 maintained by the end-users, and the end-users may install the onsite monitoring devices 150 at their respective structure locations. Additionally, the end-users may utilize the system support platform 140 to access various functionalities associated with monitoring weather events 135, assessing the impact or damage on the structures 130, and/or generating documentary evidence to demonstrate the impact of the weather events 135 on the structures 130. Other portions of this disclosure, including the description of FIG. 3, provide details on exemplary functionalities that may be accessed via the system support platform 140.

Each of the onsite monitoring devices 150 may include software and/or hardware configured to monitor weather conditions, including severe weather events 135, at locations of structures 130 where the onsite monitoring devices 150 are installed and/or record various types of data to document the impact of the weather conditions on the structures 130. Exemplary software and hardware components that may be integrated with the onsite monitoring devices 150 are described in other portions of this disclosure, including the descriptions of FIGS. 2A and 2B.

The onsite monitoring devices 150 generally can be utilized to detect, monitor, and/or record any type of weather condition and/or weather event 135. In some examples, an onsite monitoring device 150 can be configured to detect, monitor, and/or record severe weather events 135 such as those involving hailstorms, high-speed winds, tornados, heavy rains, floods, and/or other conditions that can potentially cause damage to a structure 130 (e.g., such as a building or house).

While certain portions of this disclosure describe examples in which the onsite monitoring device 150 is utilized to detect, monitor, record, and/or assess severe weather events 135 with conditions that commonly cause damage, it should be understood that the system 100 also can detect, monitor, record, and/or assess non-severe weather events 135 (e.g., light rains, sunshine, cloud cover, light winds, etc.). For example, the onsite monitoring devices 150 can be utilized to record damage caused to structures 130 (or components of the structures) by excessive exposure to sun light over time, or may record leak damage that resulted from light rains.

Additionally, in further examples, the system 100 can function to record or provide evidence of the absence of damage inflicted on structures 130 by weather events 135. This capability is particularly valuable in scenarios where property owners, insurers, or contractors need to verify that a structure has remained unaffected by a specific weather event. By capturing and analyzing data from onsite monitoring devices 150, the system can document the condition of a structure before, during, and after a weather event, thereby providing a comprehensive record that confirms the lack of damage. This evidence can be useful for resolving disputes, invalidating insurance claims, or making informed decisions about maintenance and repairs. The ability to demonstrate that a structure has withstood a weather event without damage can add an additional layer of assurance for stakeholders involved in property management and risk assessment.

As explained in further detail below, the onsite monitoring devices 150 can be equipped with sensor systems that can be utilized to generate and/or record various types of site monitoring data in the locations where the onsite monitoring devices 150 are installed. In some examples, the site monitoring data captured by sensor systems can be utilized to record data relating to the impact of weather events 135 on the structures 130, detect or validate the occurrence of specific types of weather conditions (e.g., hail impacts, strong winds, and/or other types of conditions that may cause damage), and/or indicate environment conditions (e.g., temperature, pressure, humidity, altitude, etc.) at the locations where the structures 130 are located.

In some exemplary configurations, the sensor systems integrated into the onsite monitoring devices 150 can be integrated with camera devices that utilize imaging sensors (e.g., image or video sensors) to capture image content (e.g., static images and/or videos) at the locations of the structures 130 to document the condition of a structure 130 prior to the occurrence of a severe weather event, while the severe weather event is ongoing, and/or after the severe weather event has subsided or ended. The sensor systems may further include sensing mechanisms, such as vibration sensors, accelerometers, gyroscopes, water sensors, anemometers, or the like, to detect whether or not specific types of precipitation (e.g., hail or rain) or wind conditions were detected at the sites being monitored by the onsite monitoring devices 150 and/or to trigger one or more camera devices to record data at the sites.

Additionally, in some embodiments, the onsite monitoring devices 150 also can include, or communicate with, an artificial intelligence (AI) architecture to enhance its detection, monitoring, and/or analysis of weather events and their impact on the structures 130. In some examples, the AI architecture may integrate one or more learning models that are configured to detect damage caused by a weather event 135 by applying computer vision functionalities to compare pre-event and post-event images of a structure, analyze image or video content using computer vision functionalities to detect particular types of precipitation (e.g., hail), and/or analyze image or video content using computer vision functionalities to detect damage attributed to wind conditions or other weather conditions. Further details of exemplary AI architecture configurations are described below.

As mentioned above, the onsite monitoring devices 150 can be configured to generate various types of site monitoring data. In some examples, the site monitoring data generated by an onsite monitoring device 150 can include image content (e.g., images or videos) captured by a camera device at various timeframes (e.g., prior, during, and/or after the occurrence of a severe weather event). This image content may be utilized to compare the conditions of a structure 130 before and after the occurrence of a weather event 135, and/or it may record the actual damage inflicted by the weather event 135 as it occurs. The data generated by the sensing systems and/or camera device also can be utilized to validate the occurrence of particular types of conditions (e.g., the occurrence of hail or strong winds) and/or indicate specific conditions (e.g., wind speeds, temperature, atmospheric pressure, etc.) at the locations of the structure 130. The site monitoring data captured by the onsite monitoring device 150 can include various other data and information collected and/or generated by the onsite monitoring device 150.

Some or all of the site monitoring data generated by the onsite monitoring devices 150 can be transmitted to the system support platform 140 for storage, analysis, and/or processing. The onsite monitoring devices 150 also can store the site monitoring data locally in onboard storage devices.

In certain embodiments, the system support platform 140 can be executed on one or more servers (e.g., which may be configured in a cloud server system or environment). The system support platform 140 can operate as a central hub for communication with onsite monitoring devices 150, which receives the site monitoring data generated by these devices, performs various types of analyses on the site monitoring data, and/or processes the site monitoring data to provide recorded evidence relating to weather event impacts on structures 130.

End-users can access the system support platform 140 through computing devices 110 (e.g., via a mobile app or web browser) to retrieve or view site monitoring data generated by their onsite monitoring devices 150 installed on their respective structures 130. Additionally, the end-users can utilize the system support platform 140 to generate weather event impact documentation related to the effect or impact of weather conditions on the structures 130.

In certain embodiments, the system support platform 140 also can be configured to transmit data and/or commands to the onsite monitoring devices 150 over the network 105. In some examples, the system support platform 140 can transmit software and/or firmware updates to the onsite monitoring devices 150. In other examples, the system support platform 140 can transmit commands for controlling the onsite monitoring devices 150 and/or their functionalities and components (e.g., such as to activate/deactivate the devices, initiate recording by the camera devices, provide access to a real-time video data captured by the video devices, adjust the view or positioning of the camera devices, change or adjust the operational state of the devices, and/or control other functions or components of the devices). The commands transmitted by the system support platform 140 to the onsite monitoring devices 150 may be initiated by the platform itself and/or may be sent in response to selections made by end-users accessing the system support platform 140.

Additionally, in some embodiments, the system support platform 140 can aggregate data from multiple onsite monitoring devices 150 and execute analyses on the collected data, providing comprehensive insights into weather impacts across different locations or structures. In one example, the system support platform 140 may utilize aggregated data to identify patterns or trends in weather conditions, enabling the prediction of potential future impacts on structures 130 based on historical data collected from various sites.

Additionally, in some embodiments, the system support platform 140 can utilize the aggregated data from multiple onsite monitoring devices 150 to execute analyses that provide insights into weather impacts across different locations. In one example, the analysis performed on the aggregated data can be utilized to identify or track the precise path of a storm or weather event. In another example, the analysis performed on the aggregated data can be utilized to detect damage patterns to specific types of structures 130 and/or to specific geographic regions. In another example, the system support platform 140 may utilize aggregated data to identify patterns or trends in weather events 135, enabling the prediction of potential future impacts on structures 130 based on historical data collected from various sites. In another example, the system support platform 140 might use the data to generate regional weather impact reports that can assist local authorities with planning and resource allocation for disaster preparedness and response.

Additionally, in some embodiments, the system support platform 140 and/or onsite monitoring devices 150 can access weather data from one or more weather service platforms 160 to enhance the functionalities of the system 100. Each weather service platform 160 may correspond to a third-party or external weather service provider that provides forecast data 165 on weather conditions. In some examples, the weather service platform 160 may include national weather service stations, private weather data providers, and/or other entities that supply forecasting data 165. The forecast data 165 may include radar-based swath data and/or large-area weather information or predictions. In further examples, the forecast data 165 may include severe weather alerts corresponding to various types of weather events 135 (e.g., actual or potential hailstorms, thunderstorms, high-wind events, floods, etc.).

In some examples, the system support platform 140 and/or onsite monitoring devices 150 may utilize the forecast data 165 obtained from one or more weather service platforms 160 to detect statuses of weather events 135 in locations where the onsite monitoring devices 150 are installed. For example, the data received from a weather service platform 160 can used to detect an imminent or incoming weather event in a geographic region, determine whether or not the geographic region is currently being affected by the weather event, and/or determine when the weather event in the geographic region is subsiding. As explained below, this global or large-area weather information can be utilized to transition the onsite monitoring devices 150 to various operational modes, which cause the onsite monitoring devices 150 to selectively activate/deactivate various components or functionalities based on the current status of a weather event 135 (e.g., based on whether the weather event is likely to occur, is ongoing, and/or is subsiding).

In some exemplary applications of the technologies described herein, the onsite monitoring devices 150 can be adapted to be installed on roofs (or upper portions) of buildings, houses, and/or other structures 130, and its monitoring and recording capabilities can include functions for analyzing the damage or effects of weather events 135 on the roofs of the structures 130. In one example, an onsite monitoring device 150 installed on or near the roof of a structure 130 can be used to monitor or record damage to the roof caused by hail impacts, high speeds, and/or other weather events 135. For instance, the onsite monitoring device 150 may capture data identifying missing or damaged shingles, fallen trees or debris, or the like. Likewise, the onsite monitoring device 150 also may capture data indicating damage caused to various roofing installations, such as water towers, air conditioning units, chimneys, etc.

While certain examples described in this disclosure demonstrate techniques for evaluating the impact or damage inflicted on structures 130 (e.g., such as buildings or houses) by weather events 135, the techniques described herein also can be applied to evaluate the impact or damage caused by weather events 135 on many other types of sites, assets or installations, such as vehicles, equipment, infrastructure components (e.g., bridges, roads, tunnels, etc.) and/or farmland (e.g., including fields and/or crops). Thus, any portion of this disclosure that describes assessing the impact or damage inflicted on a structure 130 equally applies to assessing the impact or damage inflicted on other types of assets or installations.

The system configurations described herein are provided as examples to demonstrate environments in which embodiments described herein can be deployed. Numerous modifications and variations to the disclosed embodiments are possible, and the techniques described herein can be implemented in many other contexts and environments.

FIG. 2A is a block diagram demonstrating exemplary features of an onsite monitoring device 150 in accordance with certain embodiments.

The configuration of the onsite monitoring device 150 can vary. All of the components illustrated in FIG. 2A are optional. Depending on the design of the onsite monitoring device 150, one or more of the components may be omitted, and/or additional components not explicitly shown can be added or integrated into the onsite monitoring device 150.

In some embodiments, the onsite monitoring device 150 comprises an enclosure 201 that includes one or more base plates 202 and one or more mounting assemblies 203. The enclosure 201 can include or integrate one or more storage devices 205, one or more processing devices 210, one or more communication devices 215, one or more motor assemblies 225, one or more sensor systems 230 (which can include, inter alia, one or more impact sensing systems 231, one or more wind sensing systems 232, and/or one or more camera devices 220), one or more power sources 235, one or more configuration systems 240, one or more sensor-triggered recording functions 245, one or more device controllers 250, one or more AI architectures 260 (which can include, inter alia, one or more hail validation models 261, and/or one or more wind damage detection models 262, one or more comparative analysis models 263).

The enclosure 201 can correspond to a housing that is formed in various shapes or sizes. In some arrangements, the housing may include a walled structure that includes an opening or recess with its walls for integrating some or all of the components illustrated in FIG. 2. Additionally, the housing can be configured to be waterproof, providing protection for the internal components against environmental factors. It may include a sealed enclosure that safeguards the internal components from rain, hail impacts, UV exposure, and/or other environmental conditions, thereby maintaining the integrity and functionality of the components housed within.

One or mounting assemblies 203 can be integrated with, or attached to the enclosure 201 to permit the enclosure 201 to be coupled to various surfaces, including roofing surfaces and/or other surfaces located at the structures 130 where the onsite monitoring device 150 is installed. The one or more mounting assemblies 203 may integrate various types of hardware connection schemes, such as hardware connectors, brackets, screws, and/or adhesive mounts, to securely attach the onsite monitoring device 150 to a surface, such as a roof, wall, or surface of a structure 130.

A bottom portion of the onsite monitoring device 150 also may incorporate a base plate 202 (or multiple base plates 202). The base plate 202 can serve as an interface between the onsite monitoring device 150 and the surface to which it is coupled, separating the coupling surface from the internal components of the onsite monitoring device 150. Additionally, in some embodiments, the base plate 202 may be adapted to receive one or more sensor devices of the sensor system 230 installed in the onsite monitoring device 150. In some examples, the base plate 202 may include an opening or attachment for receiving one or more vibration sensors and/or one or more accelerometers. By integrating these sensor devices into the base plate 202 which is placed in direct proximity of a roof surface (or other surface being monitored), the sensor devices can be positioned to detect signatures or patterns corresponding to vibrations or movements of hail and/or other types of precipitation.

One or more storage devices 205 can be integrated into the enclosure 201 of the onsite monitoring device 150. Exemplary storage devices 205 are described in other portions of this disclosure and can include various types of memory (e.g., RAM, ROM, PROM, EPROM, etc.). The one or more storage devices 205 can be configured to store software and/or firmware for operating the onsite monitoring device 150, including instructions or computing logic for implementing some or all of the functionalities performed by the onsite monitoring device 150.

One or more processing devices 210 also may be integrated into the enclosure 201 of the onsite monitoring device 150. Exemplary processing devices 210 are described in other portions of this disclosure and can include various types of devices (e.g., microcontrollers, CPUs, GPUs, etc.). The one or more processing devices 210 can be configured to execute the software, firmware, instructions, and/or computing logic stored on the one or more store devices 205 to execute some or all of the functionalities performed by the onsite monitoring device 150.

One or more communication devices 215 also may be integrated into the enclosure 201 of the onsite monitoring device 150. Exemplary communication devices 215 are described in other portions of this disclosure and can include various types of devices (e.g., transceivers, ports, connector interfaces, etc.) that enable the onsite monitoring device 150 to communicate over wired or wireless communication links with other devices and systems (e.g., such as the servers 120, system support platform 140, external anemometers, etc.)

One or more sensor systems 230 also may be integrated into the enclosure 201 of the onsite monitoring device 150. The one or more sensor systems 230 can include various sensor devices capable of monitoring conditions in the location or vicinity of the onsite monitoring device 150. Exemplary sensor devices can include any the following:

one or more imaging or video sensors, one or more audio sensors, one or more imaging sensors, one or more infrared (IR) sensors, one or more thermal imaging sensors, one or more accelerometers, one or more gyroscopes, one or more potentiometers, one or more vibration sensors, one or more temperature sensors, one or more barometric pressure sensors, one or more proximity sensors, one or more contact sensors, one or more Hall-effect sensors, one or more touch sensors, one or more optical sensors, one or more light sensors, one or more acoustic sensors, one or more magnetic contact sensors, one or more heat sensors, one or more gas sensors, one or more smoke sensors, one or more pressure sensors, one or more seismic sensors, sensors, and/or other types of sensors.

These and/or other sensor devices can be integrated into various data collection systems used to evaluate a weather event 135 and/or structure 130 where the onsite monitoring device 150 is installed. In some examples, the sensor systems 230 may be integrated with, or may include, one or more camera devices 220, one or more impact sensing systems 231, and/or one or more wind sensing systems 232.

In one example, a camera device 220 may integrate an image sensor, video sensor, audio sensor, IR sensor, thermal imaging sensor, or the like to capture image content and/or audio content associated with the weather event 135 and/or structure 130. In another example, an impact sensing system 231 may include accelerometers and/or vibration sensors to detect specific types of damage-causing precipitation, such as hail impacts. In a further example, a wind sensing system 232, which may include anemometers (and associated sensors such as pressure sensors, Hall-effect sensors, potentiometers, etc.) and/or other wind measuring devices to measure wind speeds and/or other wind-related metrics (e.g., wind direction). Additional sensors, such as temperature, precipitation, and barometric pressure sensors also can be integrated to enhance analysis of weather conditions at the time of a weather event 135 (e.g., indicating the temperature, pressure, humidity, and/or other environment conditions relating to the weather conditions or the environment of the structures 130).

Some or all of the data collected by the sensor systems 230 may be utilized to evaluate the impact of the weather event 135 on the structure 130, either by presenting the data to a human reviewer and/or using the automated AI functions described in this disclosure. In some scenarios, this data also may be utilized to validate the occurrence of damage-causing precipitation, such as hail impacts, and/or the occurrence of other types of damage-causing weather conditions, such as strong winds. Conversely, this data also may be utilized to confirm that certain types of weather conditions (e.g., hail, high speed winds, etc.) were not detected at the location of a structure and/or they were detected, but they did not result in damage to the structure 130.

The one or more camera devices 220 can generally include any type of imaging device and/or device capable of capturing images. In some examples, a camera device 220 can include one or more imaging sensors capable of capturing static images, videos, infrared images, and/or night vision images. These devices can be utilized to document weather events 135 by recording conditions at various points in time, such as before, during, and after a weather event. The camera devices 220 can be integrated into the onsite monitoring device 150 to provide visual evidence of weather impacts on structures 130 and/or to validate the occurrence of particular types of weather or precipitation conditions (e.g., to validate the occurrence of hail, rain, sleet, snow, rain, winds, etc.).

The impact sensing system 231 of the onsite monitoring device 150 can include one or more sensor devices configured to detect the impact of specific types of precipitation on a structure 130 where the device is installed. In some cases, the impact sensing system 231 may incorporate an accelerometer and/or a vibration sensor to detect the impacts and/or classify the impacts with one or more types of precipitation. In certain embodiments, the sensor devices integrated into the impact sensing system 231 can be tuned to detect hail impact signatures, which correspond to distinct patterns recognizable as hail strikes, differentiating them from other forms of precipitation (e.g., such as heavy rain).

To enhance detection and/or classification capabilities, one or more sensor devices of the impact sensing system 231, such as the accelerometer and/or vibration sensor, can be integrated into the base plate 202, allowing for precise monitoring of hail impacts on the structure. The integration of sensor devices into the base plate 202 enhances detection and classification capabilities by positioning the sensors in direct proximity to the surface being monitored, thereby increasing sensitivity to vibrations and impacts. This strategic placement allows the sensors to more accurately capture the unique signatures of hail strikes, improving the system's ability to distinguish between different types of precipitation and environmental conditions.

The wind sensing system 232 of the onsite monitoring device 150 can include one or more sensor devices configured to detect wind speed and, in some cases, other wind-related conditions. In certain configurations, the wind sensing system 232 may incorporate an anemometer, which can be integrated directly into the onsite monitoring device 150 or, alternatively, function as a separate component that communicates with the device (e.g., via a communication device 215 mentioned above). In some configurations, the wind sensing system 232 is capable of measuring real-time wind speeds directly on the structure 130 where the onsite monitoring device 150 is installed, providing highly localized wind data. Such localized measurements can capture conditions that might differ significantly from those reported by official weather stations, offering a more precise understanding of wind impacts at the specific site.

The sensor system 230 can incorporate many other types of sensing systems or sensor devices to collect data at the structure 130 where the onsite monitoring device 150 is installed. In some examples, the sensor system 230 may include sensor devices for detecting the temperature, humidity, barometric pressure, altitude, geolocation (or GPS coordinates), lightning strikes, water, air quality, light levels, sound or decibel levels, and/or other environmental or contextual parameters. The ability of the onsite monitoring device 150 to detect these additional environmental or contextual parameters can enable the system 100 to more comprehensively assess the weather conditions at the location of the onsite monitoring device in various ways. For example, these additional metrics may provide insights into the storms or weather events that affected the structure 130 and/or can be utilized to make predictions about future weather events (and the expected damage they may inflict on structures 130).

One or more motor assemblies 225 also can integrated into the enclosure 201 of the onsite monitoring device 150. The one or more motor assemblies 225 can include electric motors or servomotors for adjusting, moving, or repositioning components included on the onsite monitoring device

150. In some examples, integrating the motor assemblies 225 into the onsite monitoring device 150 can enable end-users (or the device itself) to adjust or reposition sensors, anemometers, camera devices 220, and/or components of the onsite monitoring device 150 and/or to adjust or reposition the onsite monitoring device 150 itself (e.g., to rotate the onsite monitoring device 150 or move the onsite monitoring device 150 in an upward/downward direction), which can facilitate better monitoring or recording of the impact of a weather event 135 on particular areas or installations of the structure 130.

In some examples, a motor assembly 225 can be utilized to adjust the positioning, orientation, and/or angle of one or more camera devices 220. For instance, these motor assemblies 225 enable the camera devices 220 to capture images or videos from different angles or perspectives, enhancing the monitoring capabilities of the onsite monitoring device 150.

One or more power sources 235 also can be integrated into the enclosure of the onsite monitoring device 150. The one or more power sources 235 can include any type of alternating current (AC) power source and/or direct current (DC) power source. In certain embodiments, the one or more power sources 235 can include one or more batteries (e.g., one or more rechargeable and/or non-rechargeable batteries). The one or more power sources 235 can additionally, or alternatively, include ports, connectors, wires and/or plugs that can facilitate connections to power outlets or other sources.

In certain embodiments, the one or more power sources 235 also include also one or more solar panels and/or other solar energy collection systems that enable the onsite monitoring device 150 to recharge its batteries and/or which provide power directly to the onsite monitoring device 150. Embodiments that incorporate solar energy collection systems can be beneficial as they can enable the onsite monitoring device 150 to operate off-grid and/or in remote locations that do not have access to a power grid. Additionally, in the event of a power loss or blackout (e.g., which may result from the impact of severe weather events 135), the solar energy collection systems can enable the onsite monitoring device 150 to continue functioning despite the power grid being down.

The one or more power sources 235 can be utilized to supply power to any or all of the components included in the onsite monitoring device 150 (including some or all of the components illustrated in FIG. 2A).

A configuration system 240 may be stored on the one or more storage devices 205 of the onsite monitoring device 150. The configuration system 240 may comprise computing instructions or logic configured to execute functions for initializing and/or setting up the onsite monitoring device 150.

In certain embodiments, the configuration system 240 can receive location data identifying a location where the onsite monitoring device 150 is installed, such data indicating a property address, GPS coordinates, and/or longitude/latitude coordinates. In some cases, the location data may be input by an end-user (e.g., using a computing device 110 that is paired with the onsite monitoring device 150 and/or which accesses the configuration system 240 via the system support platform 140). Additionally, or alternatively, this location data may automatically be ascertained using one or more GPS devices integrated with the onsite monitoring device 150.

Upon receiving the location data, the configuration system 240 can correlate the location data with the nearest or most accurate weather service platform 160, which may couple the onsite monitoring device 150 and/or system support platform 140 to a weather station, weather data feed, and/or application programming interface (API) associated with the weather service platform 160. The weather data obtained from one or more weather service platforms 160 can be utilized to determine regional or large-area weather information in the geographic area where the onsite monitoring device 150 is installed (e.g., such as forecast information indicating current or upcoming conditions in the geographic area and/or alerts about severe weather events). In some embodiments, during the initial forecast setup, once coordinates are established, the configuration system 240 links to relevant weather data APIs or national weather service (NWS) stations. As explained in further detail below, accessing the data from one or more weather service platforms 160 can enable the onsite monitoring device 150 to be transitioned among various operational modes.

One or more sensor-triggered recording functions 245 also may be stored on the one or more storage devices 205 of the onsite monitoring device 150. The sensor-triggered recording functions 245 may automatically activate camera devices 220 in response to certain types of sensor readings and/or in response to the sensor system 230 detecting certain types of weather conditions (e.g., severe weather conditions such as hail or high winds).

In one example, one or more sensor devices, such as an accelerometer and/or vibration sensor, may continuously listen for hail impacts on a structure 130 (e.g., on a roof surface) during one or more operational modes described herein. In response to detecting a hail impact signature, a sensor-triggered recording function 245 may initiate recording to document the hail impacts and/or any damage caused by the hail impacts. The recorded data can provide visual and/or audio evidence of the hail impact on the structure 130 (e.g., such as broken shingles, broken windows, or damaged roofing equipment), and/or can be utilized to validate the occurrence of hail conditions at the structure site (even if regional or large-area weather estimates do not indicate hail falling in the region).

In another example, an anemometer integrated into the wind sensing system 232 may continuously monitor wind speeds at a location of a structure 130. Upon detecting a significant increase in wind speed that exceeds a predefined threshold, the sensor-triggered recording function 245 may initiate recording to document the wind conditions and/or assess any potential damage caused by the high winds. The recorded data can provide visual and/or audio evidence of the wind's impact on the structure, such as dislodged roofing materials or debris impacts, and/or can be utilized to validate the occurrence of high-speed winds at the structure site (even if regional or large-area weather estimates do not indicate high-speed winds in the region).

The sensor-triggered recording functions 245 provide several advantages. Firstly, the sensor-triggered recording functions 245 permit the onsite monitoring device 150 to conserve energy or power by deactivating the camera device 220 when recording is not necessary, and selectively activating the camera device 220 when sensor readings indicate that recording should be initiated. This can be particularly beneficial in scenarios where an onsite monitoring device 150 is operating on battery power. Moreover, the sensor-triggered recording functions 245 avoid the need to parse or analyze a continuous stream of video content (or a large collection of static image content) to identify portions that are relevant to the structure damage or weather impacts because the camera device 220 is not always operating in a recording mode. Furthermore, the sensor-triggered recording functions 245 reduce memory storage requirements, as the device may only record relevant events that are triggered by sensor readings and not a continuous stream of image data.

The one or more sensor-triggered recording functions 245 can utilize sensor systems 230 to detect specific weather conditions, such as hail, and automatically initiate image or video recording. These functions may employ pattern matching and/or AI algorithms to confirm weather events and trigger recording, providing real-time documentation of weather impacts.

In certain embodiments, the onsite monitoring device 150 also can include, or communicate with, an AI architecture 260 comprising one or more learning models. Each of the learning models can be trained to perform specific tasks associated with evaluating weather events 135 and/or the effects of weather events 135 on structures 130 (e.g., roofing assemblies associated with the structures 130). Various types of learning models can be integrated which leverage deep learning, computer vision, and/or machine learning technologies.

In some embodiments, the AI architecture 260 associated with the onsite monitoring device 150 can include a hail validation model 261 configured to detect and/or validate the presence of hail in images and/or videos captured by a camera device 220. In some examples, the hail validation model 261 may comprise one or more computer vision models that are trained to perform object detection tasks and/or one or more classification tasks on imaging content captured by a camera device 220 to detect hail objects included in the imaging content.

In certain embodiments, the hail validation model 261 can be configured to analyze a subset of frames extracted from the imaging content captured by the camera device 220. These frames can be sent to the hail validation model 261 for initial analysis to detect the presence of hail. If any of the frames confirm the presence of hail, the entire video (or collection of images) is then submitted to the AI model for further verification and analysis. In some embodiments, the video and/or images associated with a confirmed hail event can further be analyzed by the hail validation model 261 to extract additional information about the conditions affecting the site (e.g., by analyzing the content to determine hail size, frequency of impacts, duration of hail event, etc.). This approach can operate to reduce the resource requirements and processing time typically associated with performing computer vision analysis functions, by initially focusing analysis tasks on a smaller subset of images that are sufficient to detect falling hail, and only processing the remaining frames in the event that the detection of hail has been confirmed.

Upon confirmation of hail presence, the system (e.g., system support platform 140) can be configured to immediately send alerts to relevant parties, such as property owners, insurers, and/or contractors. These alerts may include notifications indicating that hail was detected and/or site monitoring data 270 that is collected or generated (e.g., such as a video clip or image showing the detected hail, information identifying the structure 130 or site where hail was detected, location data associated with the structure 130 or site, timestamps indicating when hail was detected, hail size measurements extracted from the imaging content, etc.). Additionally, the event images, videos, and/or corresponding site monitoring data 270 can be stored locally on the onsite monitoring device 150 and/or on the system support platform 140 to document and/or validate the hail detection event.

In some embodiments, the AI architecture 260 associated with the onsite monitoring device 150 can include a wind damage detection model 261 configured to document and/or validate the presence of high wind conditions and/or any damage caused by the high wind conditions. In some examples, the hail validation model 261 may comprise one or more computer vision models that are trained to perform object detection tasks and/or one or more classification tasks on imaging content captured by a camera device 220 to detect objects (or changes across objects in different images) indicating wind damage inflicted on structures 130 caused by the high wind conditions. The wind damage detection model 262 can be configured to analyze footage captured during high wind events, identifying indications of wind-driven damage such as missing shingles, wind-driven debris, or the onset of roof structure concerns. In the same manner described above, confirmed wind damage events can trigger alerts to relevant parties and initiate storage protocols for the collected data.

In some embodiments, the AI architecture 260 associated with the onsite monitoring device 150 can include a comparative analysis model 263 configured to further assess the damage caused by a weather event 135 by performing a comparison of one or more pre-event images (captured prior to the weather event 135) with one or more post-event images (captured during and/or after the weather event 135). In some examples, the comparative analysis model 263 may comprise one or more computer vision models that are trained to perform object detection tasks and/or one or more classification tasks on imaging content captured by a camera device 220 to detect changes across objects (e.g., changes in roof shingles, changes in surface integrity, changes in locations of roof features, etc.) in the images and/or to detect debris that affected the structure 130.

In some exemplary use cases, the pre/post image comparison performed by the comparative analysis model 263 can be utilized to analyze wind damage, which may include identifying or detecting fallen debris due to severe winds. While large debris (e.g., fallen trees or the like) may not be directly detected as impact events by an accelerometer or vibration sensor, such can be assessed by comparing pre-storm images captured with post-storm images. Any discrepancies indicating new debris, fallen objects, or visible property damage can be flagged for further review and action.

The particular types of learning models utilized to implement the hail validation model 261, wind damage detection model 262, and comparative analysis model 263 can vary.

In some embodiments, the hail validation model 261, wind damage detection model 262, and/or comparative analysis model 263 may incorporate one or more vision transformer (ViT) models to perform their respective functionalities associated with analyzing the image content captured by a camera device 220 of the onsite monitoring device 150. These ViT models may incorporate transformer architectures that utilize self-attention mechanisms to understand the content of the images and the object detection and/or classification tasks on the image content.

Additionally, or alternatively, the hail validation model 261, wind damage detection model 262, and/or comparative analysis model 263 may incorporate one or more convolution neural network (CNN) models to perform their respective functionalities associated with analyzing the image content captured by a camera device 220 of the onsite monitoring device 150. Each CNN may represent an artificial neural network, and may be configured to analyze images and to execute deep learning functions on the images. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers can be configured to enable the CNNs to learn and execute various functions for analyzing, interpreting, and understanding the images, including any of the functions described in this disclosure.

Regardless of its configuration, the one or more CNN models can be trained to execute various computer vision functions. For example, in some cases, the models can execute object detection functions, which may include predicting or identifying locations of objects (e.g., using bounding boxes) associated with one or more target classes in the images. Additionally, or alternatively, the CNN models can execute object classification functions (e.g., which may include predicting or determining whether objects in the images belong to one or more target semantic classes and/or predicting or determining labels for the objects in the images) and/or instance segmentation functions (e.g., which may include predicting or identifying precise locations of objects in the images with pixel-level accuracy). The CNN models can be trained to perform other types of computer vision functions as well.

In some examples, the one or more CNN models can be configured to extract feature representations from input images captured by the camera device 220. The feature representations may represent embeddings, encodings, vectors, features, and/or the like, and each feature representation may include encoded data that represents and/or identifies one or more objects included in an image. In some embodiments, the neural network architecture can be trained to utilize the feature representations to execute one or more computer vision functions (e.g., object detection, object classification, and/or instance segmentation functions).

In certain embodiments, the hail validation model 261, wind damage detection model 262, and/or comparative analysis model 263 also can be implemented using other types of learning models or deep learning networks.

In certain embodiments, one or more training procedures may be executed to train the learning models corresponding to the hail validation model 261, wind damage detection model 262, and comparative analysis model 263 to perform the computer vision functions described in this disclosure. The training procedures can enable the models to learn or identify various types of features corresponding to structures 130 (e.g., roof assemblies, installations, construction materials, shingles, etc.) and features corresponding to weather conditions (e.g., such as objects indicative of hail, rain, precipitation, and/or other weather conditions), and/or to identify visual content indicative of damage (e.g., missing or damaged shingles, fallen trees, debris, dented or ruptured surfaces, etc.).

The specific procedures that are utilized to train the models can vary. In some cases, one more supervised training procedures, one or more unsupervised training procedures, and/or one or more semi-supervised training procedures may be applied to train the models. In some preferred embodiments, one or more supervised training procedures may utilize labeled image content corresponding to features of structures, weather conditions, and/or visual content indicative of damage (e.g., hail or wind damage) to train the models. Other training approaches also may be applied.

For simplicity purposes, certain portions of this disclosure may describe each of the hail validation model 261, wind damage detection model 262, and/or comparative analysis model 263 as a single learning model that executes the image and/or video analysis functions described herein. However, it should be understood that the hail validation model 261, wind damage detection model 262, and/or comparative analysis model 263 can each include a plurality of separate learning models, each of which is trained to perform certain tasks or functions and these models can be combined to in various ways to achieve the image or video analysis functions described herein. Thus, any portion of this disclosure that describes communications with a single learning model can be interpreted as communicating with one or more learning models.

Additionally, for simplicity purposes, certain portions of this disclosure also may describe the onsite monitoring device 150 or system support platform 140 as hosting the AI architecture 260 and/or the learning models corresponding to the AI architecture 260. However, it should be understood that the AI architecture 260, or one or more models associated with AI architecture 260, can be hosted on a separate platform that is accessed by the onsite monitoring device 150 or system support platform 140, and the onsite monitoring device 150 or system support platform 140 can communicate with the separate hosting platform (using an API and/or other communication means) to perform the image and/or video analysis functionalities described herein. Thus, any portion of this disclosure that describes accessing or utilizing the AI architecture 260 and/or the learning models described herein can be interpreted as accessing models hosted on the onsite monitoring device 150, accessing models hosted on the system support platform 140, accessing models stored on a separate platform, or a combination thereof.

The onsite monitoring device 150 may include a device controller 250 that is configured to control and operate the onsite monitoring device 150. The device controller 250 may be implemented in computing instructions and/or logic in some embodiments. In certain embodiments, the device controller 250 can be configured to operate the onsite monitoring device 150 in various operational modes based on current or predicted future weather conditions in the location of the structure 130 where the onsite monitoring device 150 is installed. The onsite monitoring device 150 may activate/deactivate various components and/or functionalities in each operational mode.

In some examples, the device controller 250 may access weather data from one or more weather service platforms 160 to determine the current weather conditions or future weather conditions at the location or in the region of the onsite monitoring device 150. Using this weather information, the device controller 250 may transition the onsite monitoring device 150 among various operational modes to capture or record site monitoring data 270 prior to the occurrence of weather event 135, during the occurrence of the weather event 135, and/or after the occurrence of the weather event 135.

In certain embodiments, the device controller 250 can transition the onsite monitoring device 150 among a first operational mode 251, a second operational mode 252, and a third operational mode 253.

In the first operational mode 251, the onsite monitoring device 150 operates in a routine monitoring state, where the majority of its components and data collection functionalities are deactivated or idle, thereby maintaining the onsite monitoring device 150 in a low-powered state. Deactivating a component may include cutting a power supply to the component, setting the component to an idle state, and/or not utilizing one or more functions of the component that draw power (e.g., not utilizing recording functions of a camera device 220 or not utilizing a sensor to collect readings). When operating in the first operational mode 251, the onsite monitoring device 150 may primarily focus on periodic monitoring of weather conditions by analyzing forecast data from one or more weather service platforms 160. For example, the onsite monitoring device 150 may periodically perform a forecast pull, where it polls the local forecast, such as from the National Weather Service (NWS) or another public API, at specified intervals (e.g., in some cases, every 60 minutes).

During this routine monitoring, if the forecast data does not indicate that a severe weather event 135 (e.g., thunderstorms, snowstorms, high winds, tornados, high winds, etc.) is upcoming, the onsite monitoring device 150 may remain in the first operational mode 251. However, if the forecast suggests the potential for a severe weather event 135, the device controller 250 may transition the onsite monitoring device 150 to the second operational mode 252. This transition allows the onsite monitoring device 150 to adjust its monitoring capabilities in response to changing weather conditions, preparing for more active surveillance and data collection as needed.

In the second operational mode 252, the onsite monitoring device 150 transitions to a heightened state of alert in response to detecting an incoming weather event 135. This mode involves more active polling of weather data APIs affiliated with weather service platforms 160 (e.g., with the system checking the National Weather Service (NWS) or similar alert services more frequently, in some cases, every 10 minutes or less) for severe weather watches or warnings corresponding to thunderstorms, snowstorms, high winds, tornados, high winds, etc. During this period, the wind sensing system 232 and/or the anemometer can be activated to closely monitor wind speeds, providing real-time data on any significant changes in wind conditions.

Additionally, the camera device 220 may be utilized to capture one or more images or videos to establish pre-event conditions, although it may not be configured in a fully active state (e.g., in which it is continuously capturing image/video data). This can involve taking periodic snapshots and/or brief video clips to create a baseline record of the property before the weather event 135 occurs. These pre-event images can later be used for post-event comparisons, allowing for the identification of changes such as fallen trees, missing shingles, or other damage that may result from the weather event 135.

The second operational mode 252 can also include a status evaluation process to determine the appropriate device setting based on the evolving weather conditions. If no severe weather watch or warning is posted, or if the forecast improves, the device controller 250 may revert to the first operational mode 251, maintaining a routine monitoring state. However, if a relevant severe weather warning is issued (e.g., indicating an imminent likelihood of hail, tornadoes, storms, or high winds), the device controller 250 can transition the onsite monitoring device 150 to the third operational mode 253 for full engagement, activating additional monitoring and data collection functions to address the impending weather threat.

In the third operational mode 253, the onsite monitoring device 150 enters a state of full engagement in response to an active severe weather event or alert. Any components of the onsite monitoring device 150 may be activated and/or utilized to more comprehensively collect data on the weather conditions and their impact on the structure 130. This can include activating any camera devices 220, sensor systems 230, and/or anemometers to collect data. This also can include the activation and/or deployment of sensor-triggered recording functions 245, hail validation model 261, wind damage detection model 262, and/or comparative analysis model 263, which can work in concert to evaluate and/or document the effects of the weather event both as it occurs and afterward.

For example, the sensor-triggered recording function 245 may initiate real-time recording of images and/or videos, capturing the immediate impact of the weather event on the structure. The hail validation model 261 can analyze the captured footage to confirm the presence of hail (or lack thereof), while the wind damage detection model 262 assesses the footage for signs of wind-driven damage, such as missing shingles or debris impacts. The comparative analysis model 263 can perform pre-event and post-event image comparisons to identify changes and damage that may have occurred, providing a further information for the assessment of the event's impact.

This data collection and analysis process allows for a thorough evaluation of the weather event's effects on the structure 130, facilitating informed decision-making regarding repairs, insurance claims, and/or future preventive measures. Once the severe weather event has subsided, the device controller 250 may revert to the second operational mode 252 or the first operational mode 251, depending on the forecast and current conditions, thereby resuming routine monitoring or heightened alert as necessary.

The control algorithm or process executed by the device controller 250 to transition the onsite monitoring device 150 among the various operational states provides several advantages. One advantage is the reduced power requirements, as the onsite monitoring device 150 conserves energy by activating only the necessary components during each operational mode. This efficient power management is particularly beneficial for battery-operated devices, extending their operational lifespan and reducing the need for frequent recharging.

Another advantage is the lower wear and tear on components, as the device controller 250 minimizes the activation of device parts when they are not needed. By limiting the use of components to only when they are needed, the device controller 250 prolongs the life of the hardware, reducing maintenance costs and the likelihood of component failure over time.

Additionally, the device controller 250 can reduce network traffic by only activating devices to transmit site monitoring data in areas that are affected (or expected to be affected) by impending weather events 135. This targeted approach to activation means that site monitoring data may only be transmitted during the timeframe in which a weather event occurs, optimizing bandwidth usage and preventing unnecessary data congestion on the network. This efficiency not only enhances the system's performance but also ensures that critical data is prioritized during severe weather events.

Another advantage relates to reduced storage requirements that can be attributed to the selective collection of data in certain modes or scenarios. Rather than continuously recording and storing large volumes of data, the control algorithm allows components to remain idle or dormant when they are not needed. Consequently, the system can operate efficiently with smaller storage capacities, lowering costs associated with memory devices and reducing the overall footprint of the hardware. Additionally, this selective recording strategy enhances data management by simplifying the retrieval and analysis of pertinent information, ensuring that only the most critical data is prioritized for storage and review. This efficiency not only optimizes storage usage but also facilitates faster data processing and transmission, improving the system's responsiveness during severe weather events.

Figure 2B:
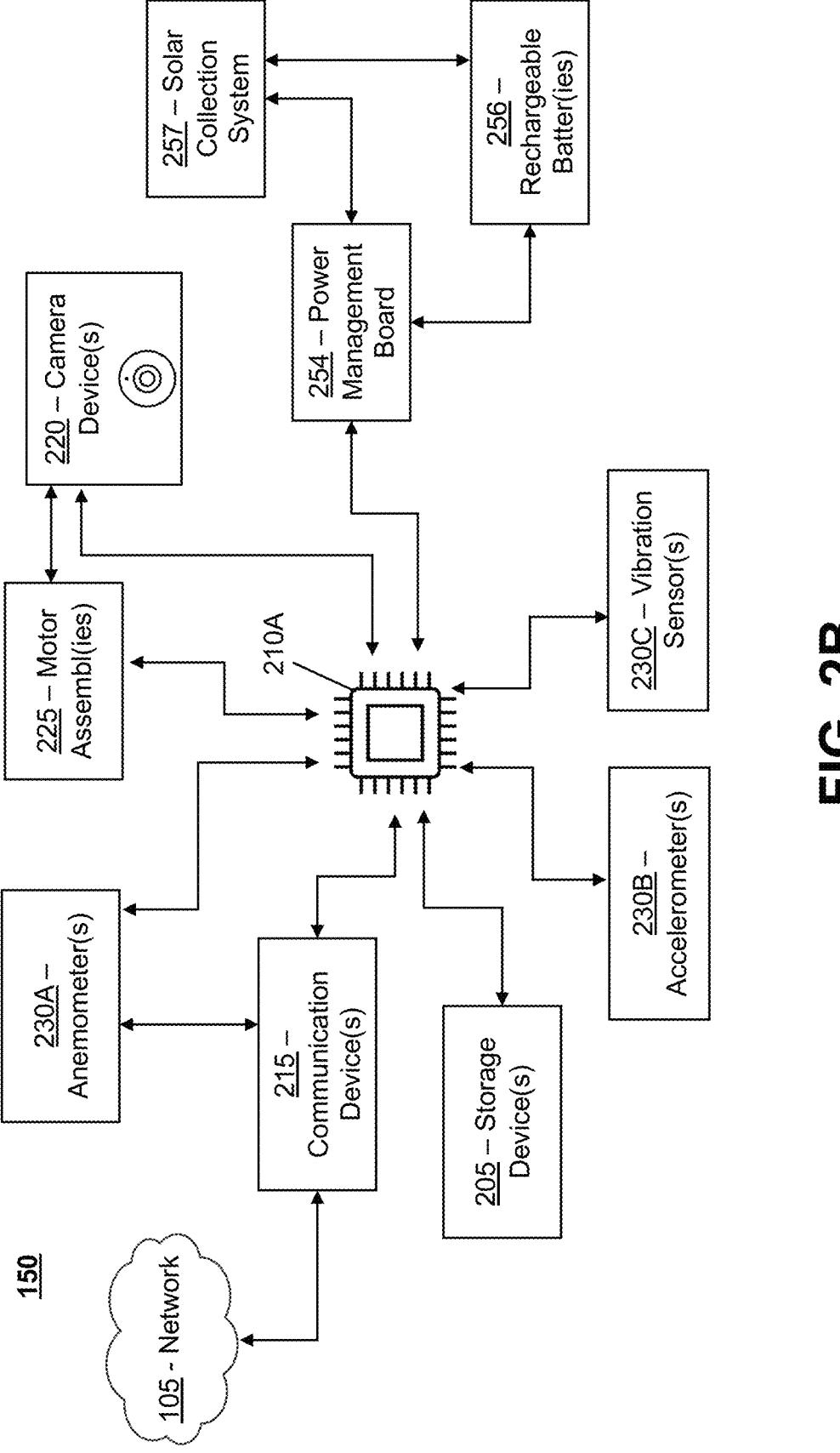
FIG. 2B is a diagram illustrating one exemplary configuration of an onsite monitoring device in accordance with certain embodiments.

FIG. 2B illustrates one exemplary configuration of an onsite monitoring device 150 according to certain embodiments.

In this exemplary embodiment, the onsite monitoring device 150 comprises at least one storage device 205, at least one communication device 215, at least one camera device 220, at least one anemometer 230A, at least one accelerometer 230B, at least one vibration sensor 230C, at least one motor assembly 225, at least one power management board 254, at least one rechargeable battery 256, and at least one solar collection system: 257. The onsite monitoring device 150 further comprises at least one microcontroller 210A that is directly or indirectly coupled to each of the aforementioned components.

The microcontroller 210A can operate as the local "brain," running embedded software on the storage device 105A to collect sensor readings, trigger camera captures, perform initial data handling, and/or transmit commands for activating/deactivating components and/or controlling functions of the components. The control algorithm or process associated with the device controller 250 also can be stored on the storage device 105A and executed by the microcontroller 210A to transition the onsite monitoring device 150 (and the aforementioned components) among the first operational mode 251, second operational mode 252, and third operational mode 253 described herein. This storage device 105A also can provide onboard memory that stores various site monitoring data 270 generated by the onsite monitoring device 150 (e.g., such as images, videos, audio recordings, sensor logs, system data, etc.).

Additionally, in this exemplary configuration, the sensor systems 230 integrated into the onsite monitoring device 150 include, inter alia, an anemometer 230A, an accelerometer 230B, a vibration sensor 230C, and/or a camera device 220.

The accelerometer 230B and/or the vibration sensor 230C may be incorporated into the impact sensing system 231 to detect when the occurrence of hail conditions and/or other severe weather conditions are present. In some configurations, the accelerometer 230B and/or the vibration sensor 230C can be integrated into a base plate 202 of the device's enclosure 201 to position them in direct proximity to a structure surface that is being monitored for hail impacts and/or other precipitation impacts.

Camera devices 220 can record images/videos at various points in time: e.g., 1) prior to the occurrence of a weather event to establish conditions at a structure 130 before the occurrence of a weather event 135; 2) during the occurrence of a weather event 135 to record actual conditions of the event and/or to record any damage as it occurs; and/or 3) after the occurrence of the weather event to document damage and/or the impact of the weather event on the structure. The motor assembly 225 may comprise an electronic motor and/or servomotor that enables the repositioning of the camera device 220.

The anemometer 230A can be incorporated into the wind sending system 232 of the onsite monitoring device 150 to measure wind speed at a structure 130 where the onsite monitoring device 150 is installed. The anemometer 230A can either be integrated into the enclosure 201 of the onsite monitoring device 150 and/or coupled to the onsite monitoring device 150 via a communication device 215 (e.g., a transceiver and/or wired connection).

The communication device 215 also can couple the onsite monitoring device 150 to a network 105 (e.g., in some cases, a network 105 that comprises a Wi-Fi network, a cellular network, the Internet, the Starlink network, and/or LoRaWAN network), which can enable the site monitoring data 270 generated by the onsite monitoring device 150 to be accessed by the system support platform 140 and/or computing devices 110. This connection also can enable the system support platform 140 and/or computing devices 110 to access the onsite monitoring device 150, such as to enable live or real-time monitoring of the conditions of a structure 130. This connection also can enable the system support platform 140 and/or computing devices 110 to control various functionalities of the onsite monitoring device 150 (e.g., to remotely activate/deactivate the device, adjust operational modes, record images/videos, adjust camera positioning, etc.).

The power management system of the onsite monitoring device 150 comprises a power management board 254, which can include a dedicated printed circuit board (PCB) designed to manage battery charging, solar input, and/or overall power regulation. The power sources 235 include one or more rechargeable batteries 256 and one or more solar collection systems 257. The one or more solar collection systems 257 may convert energy from the sun into energy that can be used to recharge the one or more rechargeable batteries 256, enabling the onsite monitoring device to operate off-grid.

Figure 4:
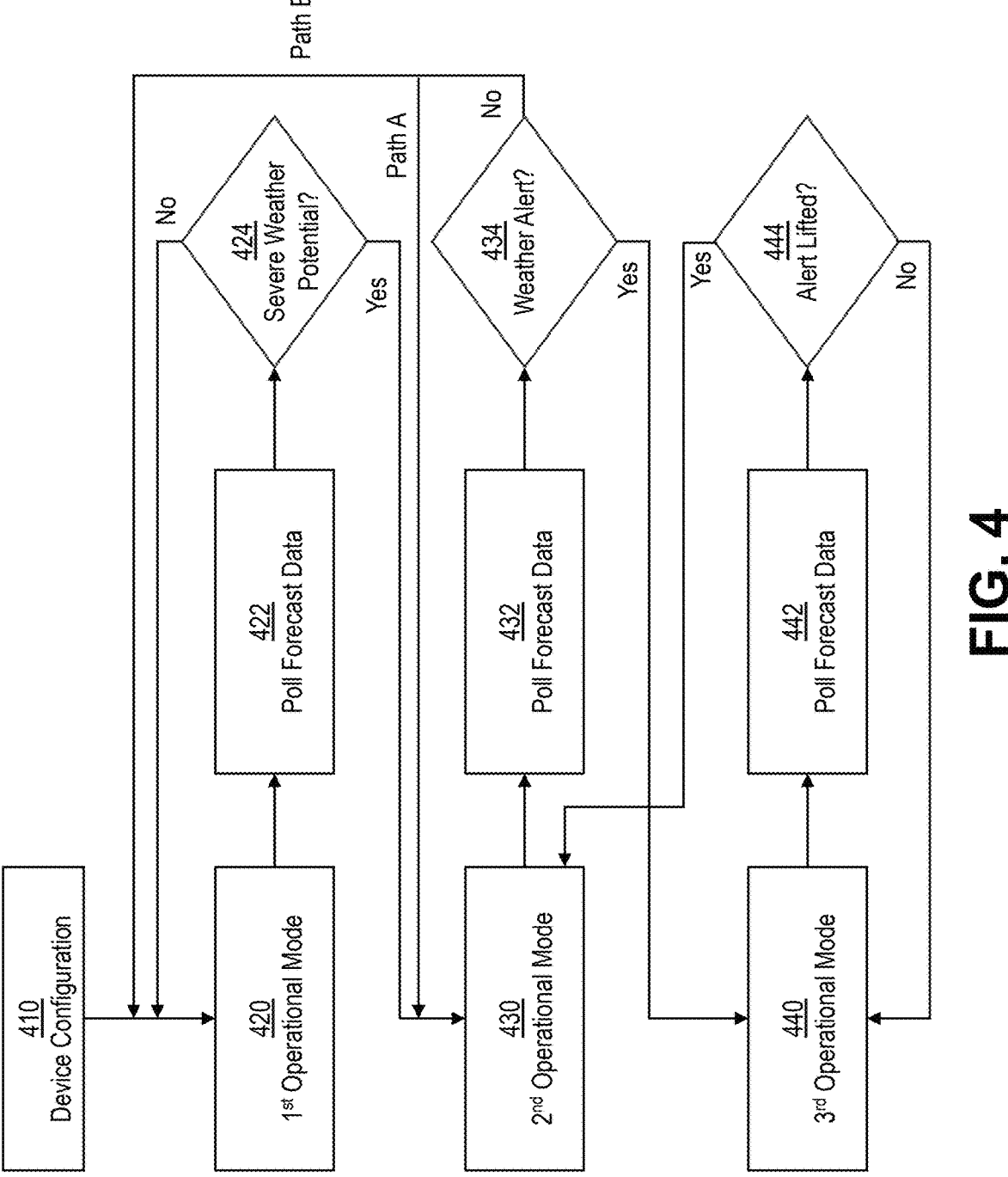
FIG. 4 is a flowchart illustrating an exemplary method for operating an onsite monitoring device in multiple operational modes in accordance with certain embodiments.

FIG. 4 illustrates a flow chart for an exemplary method 400 according to certain embodiments. Method 400 is merely exemplary and is not limited to the embodiments presented herein. Method 400 can be employed in many different embodiments or examples not specifically depicted or described herein. In some embodiments, the steps of method 400 can be performed in the order presented. In other embodiments, the steps of method 400 can be performed in any suitable order. In still other embodiments, one or more of the steps of method 400 can be combined or skipped. In many embodiments, system 100, onsite monitoring device 150, and/or device controller 250 can be configured to perform method 400 and/or one or more of the steps of method 400. In these or other embodiments, one or more of the steps of method 400 can be implemented as one or more computer instructions configured to run at one or more processing devices 210 and configured to be stored at one or more non-transitory computer storage devices 205. Such non-transitory memory storage devices 205 can be part of a system 100 and/or onsite monitoring device 150.

In some embodiments, the method 400 can be applied to manage and/or control the operation of an onsite monitoring device 150.

In step 410, an onsite monitoring device 150 is configured during a setup process. In some examples, a configuration system 240 stored on the onsite monitoring device 150 and/or an external system (e.g., the system support platform 140) may be utilized to initialize and/or configure the onsite monitoring device 150. This may include specifying location data identifying the location of the onsite monitoring device 150 and/or a structure 130 where the onsite monitoring device 150 is installed. This may include selecting at least one weather service platform 160 to provide forecast data 165 to the onsite monitoring device 150 based on the location data and/or coupling the onsite monitoring device 150 to the at least one weather service platform 160.

In step 420, the onsite monitoring device 150 is configured in a first operational mode 521 after it is configured. In the first operational mode 521, the onsite monitoring device 150 may operate in a low-power state with some or all of its components being deactivated, including any camera devices 220, anemometers 230A, and/or sensor devices integrated with, or coupled to, the onsite monitoring device 150. In the first operational mode 521, the onsite monitoring device 150 may perform routine weather monitoring functions by periodically polling and analyzing forecast data 165 from the at least one weather service platform 160, which was coupled to the onsite monitoring device 150 during configuration.

In step 422, the onsite monitoring device 150 retrieves, polls, and/or accesses the forecast data 165 from the at least one weather service platform 160.

In step 424, the onsite monitoring device 150 analyzes the forecast data 165 to determine whether it indicates a potential for a severe weather event 135 in the geographic region of the onsite monitoring device 150 and/or the structure 130 where the onsite monitoring device 150 is installed. In some cases, the forecast data 165 can be analyzed using keyword searches to determine whether a potential for a severe weather event 135 exists. Additionally, or alternatively, a language model (e.g., a transformed-based large language model or LLM) associated with the AI architecture 260 may be applied to analyze and interpret whether the forecast data 165 indicates a potential for a severe weather event 135.

If the analysis of the forecast data does not indicate a potential for a severe weather event 135 in the geographic region where the onsite monitoring device 150 is situated, then the onsite monitoring device 150 may remain in the first operational mode 251 and may resume periodic polling of forecast data.

Conversely, if the analysis of the forecast data indicates a potential for a severe weather event 135 in the geographic region where the onsite monitoring device 150 is situated, then the onsite monitoring device 150 may be transitioned to the second operational mode 252.

In step 430, the onsite monitoring device 150 is transitioned to the second operational mode 252 in response to detecting a potential severe weather event 135. In the second operational mode 252, the onsite monitoring device 150 may temporarily activate the camera device 220 to capture one or more pre-event images or videos, thereby documenting conditions of the structure 130 where it is installed prior to the occurrence of the potential severe weather event 135. In the second operational mode 252, the onsite monitoring device 150 also may retrieve, poll, and/or access the forecast data more frequently compared to the first operational mode 251.

In step 432, the onsite monitoring device 150 again retrieves, polls, and/or accesses the forecast data from the at least one weather service platform 160.

In step 434, the onsite monitoring device 150 analyzes the forecast data to determine whether it indicates a weather alert has been issued in connection with the potential severe weather event 135. Again, the forecast data can be analyzed using keyword searches and/or a language model associated with the AI architecture 260 to analyze and interpret the forecast data and determine whether it includes a weather alert.

If the analysis of the forecast data does not identify a weather alert, then the onsite monitoring device 150 may remain in the second operational mode 252 (Path A) and/or may be reverted back to the first operational mode 251 (Path B). In some embodiments, the onsite monitoring device 150 may remain in the second operational mode 252 for a predetermined period of time and/or while the current forecast indicates a potential for the potential severe weather event 135, and the onsite monitoring device 150 may be transitioned to the first operational mode 251 after the predetermined period of time has expired without detecting a weather alert and/or in response to the current forecast has been downgraded or de-escalated.

Conversely, if the analysis of the forecast data 165 identifies a weather alert, then the onsite monitoring device 150 may be transitioned to the third operational mode 253.

In step 440, the onsite monitoring device 150 is transitioned to the third operational mode 253 in response to detecting a weather alert corresponding to the potential severe weather event 135. In the third operational mode 253, the onsite monitoring device 150 can be operated in a fully active state, using some or all of its components to collect data on the weather conditions at the site and/or their impact on the structure 130. This can include activating and/or utilizing the sensor-triggered recording function 245, hail validation model 261, wind damage detection model 262, and comparative analysis model 263 to closely evaluate and document the effects of the weather event both during its occurrence and afterward. The collected data can be analyzed to assess the extent of damage to the structure 130 where the onsite monitoring device 150 is installed. In the third operational mode 253, the onsite monitoring device 150 can continue to periodically poll forecast data to determine when the weather alert is lifted.

In step 442, the onsite monitoring device 150 again retrieves, polls, and/or accesses the forecast data 165 from the at least one weather service platform 160.

In step 444, the onsite monitoring device 150 analyzes the forecast data 165 to determine if the weather alert associated with the severe weather event 135 has been lifted or de-escalated. Again, the forecast data can be analyzed using keyword searches and/or a language model associated with the AI architecture 260 to analyze and interpret the forecast data and determine whether the weather alert is lifted.

If the analysis of the forecast data 165 indicates the weather alert is still in place and/or has not been lifted, then the onsite monitoring device 150 may remain in the third operational mode 253, and may continue to document conditions at the site or structure 130 where it is installed.

Conversely, if the analysis of the forecast data 165 determines the weather alert has been lifted, downgraded, or removed, then the onsite monitoring device 150 may be transitioned to the second operational mode 252. The onsite monitoring device 150 can eventually be reverted to the first operational mode 251 when the forecast data 165 indicates the weather conditions have improved and/or there is no potential for a severe weather event.

In some embodiments, if the onsite monitoring device 150 loses network connectivity and/or its connection to the at least one weather service platform 160 and/or the system support platform 140 is severed, this may indicate that a severe weather event 135 has caused outages in the region where the onsite monitoring device 150 is located. In such cases, the onsite monitoring device 150 may automatically be transitioned to the third operational mode 253 (regardless of which operational mode it was operating in at the time of the outage).

FIG. 3 is a block diagram illustrating exemplary features of a system support platform 140 according to certain embodiments.

In this exemplary embodiment, the system support platform 140 comprises an onsite interface system 310, one or more databases 320, dashboard functions 330, an alert system 340, and an event documentation system 350.

The onsite interface system 310 enables the system support platform 140 to communicate with each of the onsite monitoring devices 150. The onsite interface system 310 may comprise one or more APIs and/or other communication frameworks that facilitate communication with each of the onsite monitoring devices 150 over a network 105. In certain embodiments, system support platform 140 can operate as a centralized endpoint that receives site monitoring data 270 from a plurality of onsite monitoring devices 150, and aggregates the collected site monitoring data 270 at a centralized location.

In certain embodiments, the onsite interface system 310 enables bi-directional communications with each onsite monitoring device 150. For example, the onsite interface system 310 may enable the system support platform 140 to collect site monitoring data 270 from each of the onsite monitoring devices 150 and also may enable the system support platform 140 to transmit control commands to the onsite monitoring devices 150 (e.g., whereby the commands can be initiated by the system support platform 140 and/or by end-users using the device dashboard functions 330).

The system support platform 140 also includes one or more databases 320. The one or more databases 320 may store various types of site monitoring data 270 generated and/or collected from each of the onsite monitoring devices 150. The site monitoring data 270 may comprise imaging data (e.g., static images and/or videos) captured by the onsite monitoring devices 150 and/or various types of data and information that can be derived from an analysis of the imaging data (e.g., such as pre-event/post-event image comparisons, detected damage, detected hail or precipitation conditions, etc.). The site monitoring data 270 also may comprise the forecast data 165 obtained from the weather service platforms 160 and/or various types of data and information that can be extracted from the forecast data 165 (e.g., weather alerts, environment conditions, etc.). The site monitoring data 270 also may comprise sensor measurements or readings obtained by some or all of the sensor devices included on the onsite monitoring devices 150 and/or various types of data and information that can be derived from the sensor measurements or readings (e.g., impact detections, damage detections, etc.).

Additionally, the one or more databases 320 also may store structure impact results 355 and/or other data generated by the event documentation system 350.

The dashboard functions 330 can include a variety of functionalities designed to facilitate interaction between end-users and their onsite monitoring devices 150. After logging into the system support platform 140, which may be accessed via a web browser and/or mobile application on the computing devices 110, end-users can view their devices and related settings and information. This may include geolocation data indicating where each device is installed, information about the structure 130 where the device is located, a device ID that uniquely identifies the device, the status of the device (such as on, off, or idle), and/or the operational mode in which the device is currently operating.

The dashboard functions 330 may also enable end-users to view current or real-time site monitoring data 270. This data can include live video feeds, recent images captured, current wind speeds at the structure 130, and/or other current environmental conditions at the structure 130.

Additionally, the dashboard functions 330 can allow end-users to transmit commands to each onsite monitoring device 150 associated with their account on the system support platform 140. These commands may include instructions to activate or deactivate the device or specific components of the device, adjust the camera view, change operational modes, and/or adjust other settings of the onsite monitoring device 150 or its components.

The dashboard functions 330 also may enable end-users to access any or all historical data collected by their onsite monitoring devices 150, providing a comprehensive view of past weather events and their impacts on the monitored structures.

The alert system 340 can be configured to transmit various types of alerts to end-users (e.g., to computing devices 110 operated by end-users). In some examples, these alerts may notify end-users of imminent or ongoing weather events, as well as the detection of specific weather conditions, such as hail or high winds. Other types of exemplary alerts are described in other portions of this disclosure. The alert system 340 can utilize various communication means to deliver these notifications, including push notifications, inbox messages, emails, and text messages.

The event documentation system 350 can be configured to provide actionable evidence immediately upon the occurrence of a weather event 135. It may enable end-users to generate various types of structure impact results 355, which serve as documentation and/or evidence of damage caused to one or more structures 130 by a weather event 135, or multiple weather events 135. These structure impact results 355 can incorporate any of the site monitoring data 270 to demonstrate the damage.

In certain use cases, the event documentation system 350 can generate documentation for homeowners, insurance providers, and contractors to assist in handling weather-related property damage. The system can produce structure impact results 355 in various formats based on the site monitoring data 270 collected for a given weather event. These results may include images, videos, audio, and/or other data collected by one or more onsite monitoring devices 150, demonstrating the impact of a weather event on a structure 130.

FIG. 3 also demonstrates that the AI architecture 260 described herein can additionally be hosted on the system support platform 140 rather than, or in addition to, being hosted on the onsite monitoring devices 150. As mentioned above, in other embodiments, the AI architecture 260 also can be hosted on a server system that is separate from the server system 120 that hosts the system support platform 140.

FIG. 5 illustrates a flow chart for an exemplary method 500 according to certain embodiments. Method 500 is merely exemplary and is not limited to the embodiments presented herein. Method 500 can be employed in many different embodiments or examples not specifically depicted or described herein. In some embodiments, the steps of method 500 can be performed in the order presented. In other embodiments, the steps of method 500 can be performed in any suitable order. In still other embodiments, one or more of the steps of method 500 can be combined or skipped. In many embodiments, system 100, onsite monitoring device 150, and/or device controller 250 can be configured to perform method 500 and/or one or more of the steps of method 500. In these or other embodiments, one or more of the steps of method 500 can be implemented as one or more computer instructions configured to run at one or more processing devices 210 and configured to be stored at one or more non-transitory computer storage devices 205. Such non-transitory memory storage devices 205 can be part of a system 100 and/or onsite monitoring device 150.

In step 510, computing instructions corresponding to a device controller 250 are stored on one or more storage devices 205 integrated with an enclosure 201 of an onsite monitoring device 150. The enclosure 201 is configured to be installed at or near a structure 130 to be monitored (e.g., in some examples, on or near a rooftop of the structure 130). The structure 130 may correspond to a commercial building, a residential building, an industrial building, a house, a dwelling, a factory, or other type of structure.

In step 520, the computing instructions corresponding to the device controller 250 are executed using one or more processing devices 210 integrated with the enclosure 201 of the one onsite monitoring device 150 and coupled to the one or more storage devices 205.

In step 530, forecast data 165 is received over a network 105 from one or more weather service platforms 160 via one or more communication devices 215 integrated with the enclosure 201 and coupled to the one or more processing devices 210. In some examples, the forecast data 165 may comprise forecasts or weather information for a geographic region, including forecasts that are based on large-area weather estimates and/or radar-based swath data. In further examples, the forecast data 165 may include weather alerts corresponding to various types of weather events 135 (e.g., actual or potential hailstorms, thunderstorms, high-wind events, floods, etc.).

In step 540, the onsite monitoring device 150 is transitioned among a plurality of operational modes based on the forecast data 165 that is received from the one or more weather service platforms 160. This transitioning enables the onsite monitoring device 150 to be configured in a low-power state and an active state that captures site monitoring data associated with documenting an impact of a weather event 145 on the structure 130.

In some examples, the onsite monitoring device 150 can be transitioned among at least three operational modes including:

A first operational mode that configures the at least one onsite monitoring device in the low-power state in response to receiving a first type of forecast data 165 (e.g., forecast data 165 that does not indicate a potential for a severe weather event in a vicinity of the structure). When arranged in the first operational mode 251, the device controller 250 can deactivate one or more sensor devices, the one or more camera devices, one or more anemometer devices, and/or other data collection systems. Additionally, when arranged in the first operational mode 251, the one or more communication devices 215 can periodically access the one or more weather service platforms 160 for updates to the forecast data at a first predefined time interval (e.g., in some cases, every sixty minutes).

A second operational mode 252 triggered in response to receiving a second type of forecast data (e.g., indicating a potential for the severe weather event). In the second operational mode 252, the device controller 250 can temporarily or selectively activate the one or more camera devices 220 to capture imaging data to document a pre-event state of the structure 130. Additionally, the one or more communication devices 215 can periodically access the one or more weather service platforms for updates to the forecast data at a second predefined time interval (e.g., in some cases, every ten minutes). The second predefined time interval can be shorter than the first predefined time interval.

A third operational mode that configures the at least one onsite monitoring device in the active state in response to receiving a third type of forecast data (e.g., indicating a weather alert). In the third operational mode, the device controller 250 can activate the one or more sensor devices, one or more camera devices, one or more anemometer devices, and/or other data collection systems to document the impact of the weather event during and/or after the occurrence of the weather event.

In step 550, while the onsite monitoring device is configured in the active state, recording the site monitoring data corresponding to the weather event 135, at least in part, by using one or more sensor devices integrated with the enclosure and one or more camera devices integrated with the enclosure. In some examples, the one or more camera devices can capture imaging data before, during, and after an occurrence of the weather event In step 560, the site monitoring data is transmitted over the network 105 to a system support platform 140 using the one or more communication devices 215 integrated with the enclosure.

The technologies described throughout this disclosure provide various benefits and advantages. Amongst other things, the techniques described herein incorporate a site-centric approach to monitoring weather conditions and assessing damage caused by weather events on structures. Unlike traditional systems that rely on weather data from large geographic areas, the onsite monitoring device can be configured to detect and monitor weather conditions, such as hail strikes and wind speeds, specifically at each site. This facilitates real-time monitoring tailored to individual property locations.

Additional advantages can be attributed to the control algorithm executed by the device controller and/or the sensor-triggered recording functions, which can minimize power usage of the onsite monitoring devices. This can be particularly beneficial for battery-operated embodiments. By selectively activating components based on weather conditions, the system can conserve energy and extend operational lifespan. As explained above, the selective activation/deactivation of device components also provides other benefits associated with avoiding the need to parse continuous streams of data for relevant content, minimizing storage space associated with the data collection systems of the device, and/or reducing network traffic on a network that connects the devices.

Additional advantages can be attributed to the structural design of the onsite monitoring device. Amongst other things, the design may integrate vibration sensors and/or accelerometers into the base plate to enhance hail impact detection capabilities. Additionally, the robust, weatherproof enclosure can protect internal components from environmental factors, ensuring reliable operation in various conditions.

Furthermore, in certain embodiments, the onsite monitoring device can be equipped with solar panels and/or solar collection systems, enabling it to operate off-grid. This feature is advantageous in scenarios where severe weather conditions cause power outages, allowing the device to continue functioning independently of the power grid. This feature also can be advantageous in scenarios where the onsite monitoring device is situated in a remote location that does not have access to a power grid.

Moreover, system may be configured to automatically record or generate evidence of weather impacts for various purposes, such as insurance claims, repairs, and property management. By leveraging sensor data and/or AI analysis capabilities, the system can provide detailed documentation of weather events and their effects on structures.

As evidenced by the disclosure herein, the inventive techniques set forth in this disclosure are rooted in computer technologies that overcome existing problems in known weather monitoring systems, including problems dealing with the accuracy and specificity of weather impact assessments at individual property levels. The technologies described in this disclosure provide a technical solution (e.g., one that utilizes specialized hardware devices with sensor integration, power control optimization, and/or AI-based analysis) for overcoming the limitations associated with known techniques. This technology-based solution marks an improvement over existing capabilities and functionalities related to property-specific weather monitoring by improving the precision and reliability of data collection and damage assessment.

In certain embodiments, a system for monitoring a weather event and recording its impact on a structure can include a system support platform stored on one or more servers, which may be configured to communicate with multiple onsite monitoring devices installed at various structures across different geographic locations. Each onsite monitoring device can comprise an enclosure designed to be installed at or near a structure to be monitored. The system may also include at least one onsite monitoring. The device may include one or more storage devices integrated with the enclosure, storing computing instructions for a device controller that is configured to transition the device among various operational modes based on forecast data received from one or more weather service platforms. Additionally, the device can include one or more processing devices integrated with the enclosure and coupled to the storage devices, configured to execute the computing instructions for the device controller. The device may also have one or more sensor devices integrated with the enclosure and coupled to the processing devices, configured to detect or monitor weather conditions at the structure's location during a weather event. Furthermore, the device can include one or more camera devices integrated with the enclosure and coupled to the processing devices, configured to capture imaging data of the structure before, during, and after the weather event. The device may also have one or more communication devices integrated with the enclosure and coupled to the processing devices, configured to communicate with the system support platform and the weather service platforms over a network. Power to some or all of these components can be supplied by one or more power sources integrated with the enclosure. The processing devices may execute the computing instructions to transition the device among operational modes, configuring it in a low-power state upon receiving a first type of forecast data and in an active state upon receiving another type of forecast data. In the active mode, the device may be configured to capture site monitoring data documenting the weather event's impact on the structure. The communication devices can be configured to transmit this site monitoring data over the network to the system support platform.

In certain embodiments, the system can include a device controller configured to transition at least one onsite monitoring device among at least three operational modes. The first operational mode may configure the onsite monitoring device in the low-power state in response to receiving a first type of forecast data that does not indicate a potential for a severe weather event near the structure. In this mode, the device controller can deactivate the sensor devices and/or camera devices, while the communication devices may periodically access the weather service platforms for forecast updates at a first predefined time interval. The second operational mode can be triggered by receiving a second type of forecast data indicating a potential severe weather event. In this mode, the device controller may temporarily activate the camera devices to capture images documenting a pre-event state of the structure, and the communication devices can periodically access the weather service platforms for forecast updates at a second predefined time interval. The third operational mode may configure the onsite monitoring device in the active state in response to receiving a third type of forecast data indicating a weather alert. In this mode, the device controller can activate the sensor devices and camera devices to document the impact of the severe weather event during and/or after its occurrence.

In certain embodiments, the system can include at least one onsite monitoring device that may further comprise or communicate with at least one anemometer configured to measure wind speed at the location of the structure. The device controller can deactivate the anemometer in the low-power state and activate it in the active state.

In certain embodiments, the system can include one or more sensor devices that may include at least one accelerometer and/or at least one vibration sensor. These sensors can collect readings at the location of the structure when the onsite monitoring device is configured in the active state. The device may compare the sensor readings collected by the accelerometer and/or vibration sensor to a hail signature pattern to determine whether the structure was impacted by hail.

In certain embodiments, the onsite monitoring device may be configured to execute a sensor-triggered recording function that selectively utilizes the camera devices to capture images at the location of the structure. This function can be activated in response to sensor readings from the accelerometer and/or vibration sensor indicating a hail impact on the structure.

In certain embodiments, the site monitoring data generated by the onsite monitoring device can comprise imaging data of the structure captured before, during, and after the occurrence of the weather event. This data may also include information indicating whether the structure was impacted by hail or other types of precipitation, and/or data indicating wind conditions at the location of the structure during the weather event.

In certain embodiments, the onsite monitoring device may include or communicate with an artificial intelligence architecture that utilizes one or more computer vision models. These models can analyze the imaging data captured by the camera devices installed in the enclosure for evaluating the weather event and/or its impact on the structure.

In certain embodiments, the artificial intelligence architecture may comprise a comparative analysis model configured to perform a comparison of pre-event and post-event images captured by the camera devices. This comparison can be used to assess the impact of the weather event on the structure.

In certain embodiments, the artificial intelligence architecture may comprise at least one of a hail validation model and a wind damage detection model. The hail validation model can be pre-trained to detect objects corresponding to hail and/or determine the size of hail objects, analyzing the imaging content captured by the camera devices to determine whether hail was detected during the weather event at the structure's location. The wind damage detection model can be configured to analyze changes in the structure to detect the impact of wind conditions associated with the weather event.

In certain embodiments, the one or more power sources integrated into the enclosure of the onsite monitoring device may include rechargeable batteries and at least one solar collection system. This solar collection system can be utilized to recharge the batteries.

In certain embodiments, the system support platform may operate as a centralized endpoint that receives site monitoring data from multiple onsite monitoring devices. The platform can enable end-users to access the site monitoring data and generate documentation that evidences the impacts of weather events on the structures.

In certain embodiments, the onsite monitoring device may be adapted to be installed on a roof of the structure. The sensor devices and camera devices can be adapted to collect site monitoring data indicating the impact of the weather event on the roof of the structure.

In certain embodiments, a method for monitoring a weather event and recording its impact on a structure can include storing computing instructions on one or more storage devices integrated within an enclosure of an onsite monitoring device. This enclosure may be configured to be installed at or near a structure to be monitored. The method can involve executing the computing instructions corresponding to the device controller using one or more processing devices integrated with the enclosure and coupled to the storage devices. The method may also include receiving forecast data over a network from one or more weather service platforms via communication devices integrated with the enclosure and coupled to the processing devices. The onsite monitoring device can be transitioned among a plurality of operational modes based on the forecast data received from the weather service platforms. In response to receiving a first type of forecast data, the onsite monitoring device may be configured in a low-power state. In response to receiving another type of forecast data, the device can be configured in an active state to capture site monitoring data associated with documenting the impact of a weather event on the structure. While in the active state, the method can involve recording site monitoring data corresponding to the weather event using sensor devices and camera devices integrated with the enclosure, where the camera devices capture imaging data before, during, and after the occurrence of the weather event. Finally, the method may include transmitting the site monitoring data over the network to a system support platform using the communication devices.

In certain embodiments, an onsite monitoring device configured to monitor a weather event and record its impact on a structure can include an enclosure adapted to be installed at or near a structure. The device may comprise one or more storage devices integrated with the enclosure, storing computing instructions for implementing a device controller that is configured to transition the device among various operational modes based on forecast data received from one or more weather service platforms. The device can also include one or more processing devices integrated with the enclosure and coupled to the storage devices, configured to execute the computing instructions corresponding to the device controller. Additionally, the device may have one or more sensor devices integrated with the enclosure and coupled to the processing devices, configured to detect or monitor weather conditions at the structure's location during a weather event. The device can further include one or more camera devices integrated with the enclosure and coupled to the processing devices, configured to capture imaging data of the structure before, during, and after the weather event. The device may also have one or more communication devices integrated with the enclosure and coupled to the processing devices, configured to communicate with the weather service platforms over a network. Power to these components can be supplied by one or more power sources integrated with the enclosure. The processing devices may execute the computing instructions to transition the device among operational modes, configuring it in a low-power state upon receiving a first type of forecast data and in an active state upon receiving another type of forecast data to capture site monitoring data documenting the weather event's impact on the structure. The communication devices can be configured to transmit this site monitoring data over the network to the system support platform.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A system for monitoring a weather event and recording an impact of the weather event on a structure:

a system support platform stored on one or more servers and configured to communicate with a plurality of onsite monitoring devices installed at a plurality of structures in different geographic locations; and at least one onsite monitoring device comprising an enclosure that is configured to be installed at or near a structure to be monitored, wherein the at least one onsite monitoring device comprises:

one or more storage devices integrated with the enclosure and storing computing instructions for implementing a device controller that is configured to transition the at least one onsite monitoring device among a plurality of operational modes based on forecast data received from one or more weather service platforms;

one or more processing devices integrated with the enclosure and coupled to the one or more storage devices, the one or more processing devices being configured to execute the computing instructions corresponding to the device controller;

one or more sensor devices integrated with the enclosure and coupled to the one or more processing devices, the one or more sensor devices configured to detect or monitor weather conditions at a location of the structure during an occurrence of a weather event in a vicinity of the structure;

one or more camera devices integrated with the enclosure and coupled to the one or more processing devices, the one or more camera devices being configured to capture imaging data of the structure before, during, and after the occurrence of the weather event;

one or more communication devices integrated with the enclosure and coupled to the one or more processing devices, the one or more communication devices being configured to communicate with the system support platform and the one or more weather service platforms over a network; and one or more power sources integrated with the enclosure and configured to supply power to the one or more storage devices, the one or more processing devices, the one or more sensor devices, the one or more camera devices, and the one or more communication devices;

wherein the one or more processing devices are configured to execute the computing instructions corresponding to the device controller to transition the at least one onsite monitoring device among the plurality of operational modes including:

a first operational mode that configures the at least one onsite monitoring device in a low-power state in response to receiving a first type of forecast data that does not indicate a potential for a severe weather event in the vicinity of the structure, wherein, when arranged in the first operational mode, the device controller deactivates the one or more sensor devices and the one or more camera devices, and the one or more communication devices periodically access the one or more weather service platforms for updates to the forecast data at a first predefined time interval;

a second operational mode triggered in response to receiving a second type of forecast data indicating a potential for the severe weather event, wherein, in the second operational mode, the device controller temporarily activates the one or more camera devices to capture one or more images to document a pre-event state of the structure and the one or more communication devices periodically access the one or more weather service platforms for updates to the forecast data at a second predefined time interval; and a third operational mode that configures the at least one onsite monitoring device in an active state in response to receiving a third type of forecast data indicating a weather alert, wherein, in the third operational mode, the device controller activates the one or more sensor devices and the one or more camera devices to document the impact of the severe weather event during and/or after the occurrence of the severe weather event;

wherein, the at least one onsite monitoring device includes or communicates with an artificial intelligence (AI) architecture comprising a hail validation model that is pre-trained to detect objects corresponding to hail;

wherein, in the third operational mode, the hail validation model analyzes the imaging data captured by the one or more camera devices to determine whether hail was detected during the occurrence of the weather event at the location of the structure; and wherein the one or more communication devices are configured to transmit site monitoring data over the network to the system support platform.

2. The system of claim 1, wherein the at least one onsite monitoring device further comprises or communicates with at least one anemometer that is configured to measure wind speed at the location of the structure, and the device controller deactivates the at least one anemometer in the low-power state and activates the at least one anemometer in the active state.

3. The system of claim 1, wherein the one or more sensor devices include at least one accelerometer and/or at least one vibration sensor that collect sensor readings at the location of the structure when the at least one onsite monitoring device is configured in the active state, and the at least one onsite monitoring device compares the sensor readings collected by the at least one accelerometer and/or the at least one vibration sensor to a hail signature pattern to determine whether or not the structure was impacted by hail.

4. The system of claim 3, wherein the at least one onsite monitoring device is configured to execute a sensor-triggered recording function that selectively utilizes the one or more camera devices to capture one or more images at the location of the structure in response to the sensor readings from at least one accelerometer and/or the at least one vibration sensor indicating a hail impact on the structure.

5. The system of claim 1, wherein the site monitoring data generated by the at least one onsite monitoring device comprises: the imaging data of the structure captured before, during, and after the occurrence of the weather event; data indicating whether or not the structure was impacted by hail or other types of precipitation; and/or data indicating wind conditions at the location of the structure during the occurrence of the weather event.

6. The system of claim 1, wherein the AI architecture utilizes one or more computer vision models to analyze the imaging data captured by the one or more camera devices installed in the enclosure for evaluating the weather event and/or evaluating the impact of the weather event on the structure.

7. The system of claim 6, wherein the AI architecture comprises a comparative analysis model configured to perform a comparison of one or more pre-event images and one or more post-event images captured by the one or more camera devices to assess the impact of the weather event on the structure.

8. The system of claim 6, wherein the AI architecture comprises:

a wind damage detection model that is configured to analyze changes in the structure to detect the impact of wind conditions associated with the weather event on the structure.

9. The system of claim 1, wherein one or more power sources integrated into the enclosure of at least one onsite monitoring device include one or more rechargeable batteries and at least one solar collection system that is utilized to recharge one or more batteries.

10. The system of claim 1, wherein the system support platform operates as a centralized endpoint that receives the site monitoring data from the plurality of onsite monitoring devices, and system support platform enables end-users to access the site monitoring data and generate documentation corresponding to impacts of weather events on the plurality of structures.

11. The system of claim 1, wherein the at least one onsite monitoring device is adapted to be installed on a roof of the structure, and the one or more sensor devices and the one or more camera devices are adapted to collect site monitoring data indicating the impact of the weather event on the roof of the structure.

12. A method for monitoring a weather event and recording an impact of the weather event on a structure, the method comprising:

storing computing instructions corresponding to a device controller on one or more storage devices integrated within an enclosure of an onsite monitoring device, the enclosure being configured to be installed at or near a structure to be monitored;

executing the computing instructions corresponding to the device controller using one or more processing devices integrated with the enclosure and coupled to the one or more storage devices;

receiving, over a network, forecast data from one or more weather service platforms via one or more communication devices integrated with the enclosure and coupled to the one or more processing devices;

transitioning the onsite monitoring device among a plurality of operational modes based on the forecast data that is received from the one or more weather service platforms, wherein the plurality of operational modes include:

a first operational mode that configures the onsite monitoring device in a low-power state in response to receiving a first type of forecast data that does not indicate a potential for a severe weather event in a vicinity of the structure, wherein, when arranged in the first operational mode, the device controller deactivates one or more sensor devices and one or more camera devices, and the one or more communication devices periodically access the one or more weather service platforms for updates to the forecast data at a first predefined time interval;

a second operational mode triggered in response to receiving a second type of forecast data indicating a potential for the severe weather event, wherein, in the second operational mode, the device controller temporarily activates the one or more camera devices to capture one or more images to document a pre-event state of the structure and the one or more communication devices periodically access the one or more weather service platforms for updates to the forecast data at a second predefined time interval; and a third operational mode that configures the onsite monitoring device in an active state in response to receiving a third type of forecast data indicating a weather alert, wherein, in the third operational mode, the device controller activates the one or more sensor devices and the one or more camera devices to document the impact of the severe weather event during and/or after an occurrence of the severe weather event;

wherein, the onsite monitoring device includes or communicates with an artificial intelligence (AI) architecture comprising a hail validation model that is pre-trained to detect objects corresponding to hail;

wherein, in the third operational mode, the hail validation model analyzes imaging data captured by the one or more camera devices to determine whether hail was detected during the occurrence of the weather event at a location of the structure; and transmitting site monitoring data over the network to a system support platform using the one or more communication devices.

13. An onsite monitoring device configured to monitor a weather event and record an impact of the weather event on a structure, the onsite monitoring device comprising:

an enclosure adapted to be installed at or near a structure;

one or more storage devices integrated with the enclosure and storing computing instructions for implementing a device controller that is configured to transition the onsite monitoring device among a plurality of operational modes based on forecast data received from one or more weather service platforms;

one or more processing devices integrated with the enclosure and coupled to the one or more storage devices, the one or more processing devices being configured to execute the computing instructions corresponding to the device controller;

one or more sensor devices integrated with the enclosure and coupled to the one or more processing devices, the one or more sensor devices configured to detect or monitor weather conditions at a location of the structure during an occurrence of a weather event;

one or more camera devices integrated with the enclosure and coupled to the one or more processing devices, the one or more camera devices being configured to capture imaging data of the structure before, during, and after the occurrence of the weather event;

one or more communication devices integrated with the enclosure and coupled to the one or more processing devices, the one or more communication devices being configured to communicate with the one or more weather service platforms over a network; and one or more power sources integrated with the enclosure and configured to supply power to the one or more storage devices, the one or more processing devices, the one or more sensor devices, the one or more camera devices, and the one or more communication devices;

wherein the one or more processing devices are configured to execute the computing instructions corresponding to the device controller to transition the onsite monitoring device among the plurality of operational modes such that: including:

a first operational mode that configures the onsite monitoring device in a low-power state in response to receiving a first type of forecast data that does not indicate a potential for a severe weather event in a vicinity of the structure, wherein, when arranged in the first operational mode, the device controller deactivates the one or more sensor devices and the one or more camera devices, and the one or more communication devices periodically access the one or more weather service platforms for updates to the forecast data at a first predefined time interval;

a second operational mode triggered in response to receiving a second type of forecast data indicating a potential for the severe weather event, wherein, in the second operational mode, the device controller temporarily activates the one or more camera devices to capture one or more images to document a pre-event state of the structure and the one or more communication devices periodically access the one or more weather service platforms for updates to the forecast data at a second predefined time interval; and a third operational mode that configures the onsite monitoring device in an active state in response to receiving a third type of forecast data indicating a weather alert, wherein, in the third operational mode, the device controller activates the one or more sensor devices and the one or more camera devices to document the impact of the severe weather event during and/or after the occurrence of the severe weather event;

wherein, the onsite monitoring device includes or communicates with an artificial intelligence (AI) architecture comprising a hail validation model that is pre-trained to detect objects corresponding to hail;

wherein, in the third operational mode, the hail validation model analyzes the imaging data captured by the one or more camera devices to determine whether hail was detected during the occurrence of the weather event at the location of the structure.

14. The onsite monitoring device of claim 13, wherein the onsite monitoring device further comprises or communicates with at least one anemometer that is configured to measure wind speed at the location of the structure, and the device controller deactivates the at least one anemometer in the low-power state and activates the at least one anemometer in the active state.

15. The onsite monitoring device of claim 13, wherein the one or more sensor devices include at least one accelerometer and/or at least one vibration sensor that collect sensor readings at the location of the structure when the onsite monitoring device is configured in the active state, and the onsite monitoring device compares the sensor readings collected by the at least one accelerometer and/or the at least one vibration sensor to a hail signature pattern to determine whether or not the structure was impacted by hail.

16. The onsite monitoring device of claim 13, wherein the onsite monitoring device is configured to execute a sensor-triggered recording function that selectively utilizes the one or more camera devices to capture one or more images at the location of the structure in response to detecting certain sensor readings from the one or more sensor devices.

17. The onsite monitoring device of claim 13, wherein the AI architecture analyzes the imaging data captured by the one or more camera devices installed in the enclosure to evaluate the weather event and/or the impact of the weather event on the structure, where the AI architecture comprises one or more of:

a comparative analysis model configured to perform a comparison of one or more pre-event images and one or more post-event images captured by the one or more camera devices to assess the impact of the weather event on the structure; and a wind damage detection model that is configured to analyze changes in the structure to detect the impact of wind conditions associated with the weather event on the structure.

18. The onsite monitoring device of claim 13, wherein the one or more communication devices are configured to communicate with a system support platform that operates as a centralized endpoint that receives site monitoring data from a plurality of onsite monitoring devices, and the system support platform enables end-users to access the site monitoring data and generate documentation corresponding to impacts of weather events on structures.

\* \* \* \* \*